United States Patent
Seyed et al.

(10) Patent No.: US 11,793,247 B2
(45) Date of Patent: Oct. 24, 2023

(54) SMART FABRIC THAT RECOGNIZES OBJECTS AND TOUCH INPUT

(71) Applicant: Microsoft Technology Licensing, LLC, Redmond, WA (US)

(72) Inventors: Alemayehu Seyed, Mercer Island, WA (US); Stephen Edward Hodges, Cambridge (GB); Te-Yen Wu, Norwich, VT (US); Zheer Xu, West Lebanon, NH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 17/135,524

(22) Filed: Dec. 28, 2020

(65) Prior Publication Data

US 2022/0202112 A1 Jun. 30, 2022

(51) Int. Cl.
| | |
|---|---|
| H01R 33/00 | (2006.01) |
| H04W 4/00 | (2018.01) |
| A41D 1/00 | (2018.01) |
| H04W 4/80 | (2018.01) |
| A41D 31/04 | (2019.01) |
| A41D 31/02 | (2019.01) |

(52) U.S. Cl.
CPC ............ *A41D 1/005* (2013.01); *A41D 31/02* (2013.01); *A41D 31/04* (2019.02); *H04W 4/80* (2018.02); *A41D 2500/50* (2013.01)

(58) Field of Classification Search
CPC ........ A41D 1/005; A41D 31/02; A41D 31/04; H04W 4/80
See application file for complete search history.

(56) References Cited

U.S. PATENT DOCUMENTS

| 8,948,839 B1 * | 2/2015 | Longinotti-Buitoni ..................... A61B 5/7405 600/382 |
| 9,738,219 B1 * | 8/2017 | Salter ....................... B60Q 3/51 |
| 9,863,171 B1 * | 1/2018 | Salter ...................... E05B 81/64 |
| 2015/0091859 A1 | 4/2015 | Zarraga et al. |
| 2020/0387245 A1 * | 12/2020 | Chen ..................... G06F 3/0202 |

OTHER PUBLICATIONS

Post, et al., "E-Broidery: Design and Fabrication of Textile-Based Computing", In IBM Systems Journal, vol. 39, Issue 3&4, Jul. 2000, pp. 840-860.

(Continued)

*Primary Examiner* — Phuong Chi Thi Nguyen
(74) *Attorney, Agent, or Firm* — WORKMAN NYDEGGER

(57) ABSTRACT

A piece of smart fabric for recognizing an object or a touch gesture includes a first layer and a second layer. The first layer has multiple resistive sensors and multiple capacitive sensors. Each resistive sensor corresponds to each capacitive sensor. Each capacitive sensor includes a first piece of conductive fabric and a second piece of conductive fabric, and each resistive sensor includes a piece of pressure sensing fabric sandwiched between the first piece of conductive fabric and the second piece of conductive fabric of the corresponding capacitive sensor. The second layer has multiple inductive sensors and multiple NFC sensors. Each of the multiple inductive sensors corresponds to each of the NFC sensors. Each inductive sensor and its corresponding NFC sensor share a same coil.

19 Claims, 17 Drawing Sheets

(56) References Cited

OTHER PUBLICATIONS

"International Search Report and Written Opinion Issued in PCT Application No. PCT/US21/061503", dated Mar. 24, 2022, 15 Pages. (MS# 409227-WO-PCT).
"Technical Embroidery System", Retrieved from: https://catalog.zsk.de/download/ZSK-Technical-Embroidery-Systems_2019_EN.pdf, Mar. 2019, 16 Pages.
Aigner, et al., "Embroidered Resistive Pressure Sensors: A Novel Approach for Textile Interfaces", In Proceedings of the 2020 CHI Conference on Human Factors in Computing Systems, Apr. 25, 2020, pp. 1-13.
Dobbelstein, et al., "Belt: An Unobtrusive Touch Input Device for Head-worn Displays", In Proceedings of the 33rd Annual ACM Conference on Human Factors in Computing Systems, Apr. 18, 2015, pp. 2135-2138.
Dobbelstein, et al., "PocketThumb: a Wearable Dual-Sided Touch Interface for Cursor-based Control of Smart-Eyewear", In Proceedings of the ACM on Interactive, Mobile, Wearable and Ubiquitous Technologies vol. 1 Issue 2, Jun. 2017, 17 Pages.
Edwards, Vanessa V., "Captivate: The Science of Succeeding with People", Published by Vanessa Van Edwards, 2017, 353 Pages.
Gong, et al., "Pyro: Thumb-Tip Gesture Recognition Using Pyroelectric Infrared Sensing", In Proceedings of the 30th Annual ACM Symposium on User Interface Software and Technology, Oct. 22, 2017, pp. 553-563.
Gong, et al., "Tessutivo: Contextual Interactions on Interactive Fabrics with Inductive Sensing", In Proceedings of the 32nd Annual ACM Symposium on User Interface Software and Technology, Oct. 20, 2019, pp. 29-41.
Grosse-Puppendahl, et al., "Capacitive Near-Field Communication for Ubiquitous Interaction and Perception", In Proceedings of the 2014 ACM International Joint Conference on Pervasive and Ubiquitous Computing, Sep. 13, 2014, pp. 231-242.
Grosse-Puppendahl, et al., "Finding Common Ground: A Survey of Capacitive Sensing in Human-Computer Interaction", In Proceedings of the 2017 CHI Conference on Human Factors in Computing Systems, May 6, 2017, pp. 3293-3316.
Hashimoto, et al., "LightCloth: Sensible Illuminating Optical Fiber Cloth for Creating Interactive Surfaces", In Proceedings of the SIGCHI Conference on Human Factors in Computing Systems, Apr. 27, 2013, pp. 603-606.
Heo, et al., "Force Gestures: Augmented Touch Screen Gestures Using Normal and Tangential Force", In Proceedings of the CHI '11 Extended Abstracts on Human Factors in Computing Systems, May 7, 2011, pp. 1909-1914.
Holleis, et al., "Evaluating Capacitive Touch Input on Clothes", In Proceedings of the 10th International Conference on Human Computer Interaction with Mobile Devices and Services, Sep. 2, 2008, pp. 81-90.
Hudson, et al., "Whack Gestures: Inexact and Inattentive Interaction with Mobile Devices", In Proceedings of the fourth International Conference on Tangible, Embedded, and Embodied Interaction, Jan. 25, 2010, pp. 109-112.
Koo, et al., "The Effect of Textile-Based Inductive Coil Sensor Positions for Heart Rate Monitoring", In Journal of Medical Systems vol. 38, Issue 2, Jan. 31, 2014.
Liu, et al., "Study of the Circular Flat Spiral Coil Structure Effect on Wireless Power Transfer System Performance", In Journal of Energies vol. 11, Issue 11, Oct. 23, 2018, 21 Pages.
Mikkonen, et al., "Frequency-Based Design of Smart Textiles", In Proceedings of the 2019 CHI Conference on Human Factors in Computing Systems, May 4, 2019, 12 Pages.
Olwal, et al., "E-textile Microinteractions: Augmenting Twist with Flick, Slide and Grasp Gestures for Soft Electronics", In Proceedings of the 2020 CHI Conference on Human Factors in Computing Systems, Apr. 25, 2020, 13 Pages.

Olwal, et al., "I/O Braid: Scalable Touch-Sensitive Lighted Cords Using Spiraling, Repeating Sensing Textiles and Fiber Optics", In Proceedings of the 31st Annual ACM Symposium on User Interface Software and Technology, Oct. 14, 2018, pp. 485-497.
Parzer, et al., "RESi: A Highly Flexible, Pressure-Sensitive, Imperceptible Textile Interface Based on Resistive Yarns", In Proceedings of the 31st Annual ACM Symposium on User Interface Software and Technology, Oct. 14, 2018, pp. 745-756.
Parzer, et al., "SmartSleeve: Real-time Sensing of Surface and Deformation Gestures on Flexible, Interactive Textiles, using a Hybrid Gesture Detection Pipeline", In Proceedings of the 30th Annual ACM Symposium on User Interface Software and Technology, Oct. 22, 2017, pp. 565-577.
Poupyrev, et al., "Project Jacquard: Interactive Digital Textiles at Scale", In Proceedings of the 2016 CHI Conference on Human Factors in Computing Systems, May 7, 2016, pp. 4216-4227.
Pourjafarian, et al., "Multi-Touch Kit: A Do-It-Yourself Technique for Capacitive Multi-Touch Sensing Using a Commodity Microcontroller", In Proceedings of the 32nd Annual ACM Symposium on User Interface Software and Technology, Oct. 20, 2019, pp. 1071-1083.
Profita, et al., "Don't Mind Me Touching My Wrist: A Case Study of Interacting with On-Body Technology in Public", In Proceedings of the 2013 International Symposium on Wearable Computers, Sep. 9, 2013, pp. 89-96.
Rofouei, et al., "Computing with Uncertainty in a Smart Textile Surface for Object Recognition", In Proceedings of 2010 IEEE Conference on Multisensor Fusion and Integration, Sep. 5, 2010, pp. 174-179.
Ronkainen, et al., "Tap Input as an Embedded Interaction Method for Mobile Devices", In Proceedings of the 1st International Conference on Tangible and Embedded Interaction, Feb. 15, 2007, pp. 263-270.
Saponas, et al., "PocketTouch: Through-Fabric Capacitive Touch Input", In Proceedings of the 24th Annual ACM Symposium on User Interface Software and Technology, Oct. 16, 2011, pp. 303-307.
Schneegass, et al., "GestureSleeve: Using Touch Sensitive Fabrics for Gestural Input on the Forearm for Controlling Smartwatches", In Proceedings of the 2016 ACM International Symposium on Wearable Computers, Sep. 12, 2016, pp. 108-115.
Seyed, et al., "A Modular Smartphone for Lending", In Proceedings of the 30th Annual ACM Symposium on User Interface Software and Technology, Oct. 22, 2017, pp. 205-215.
Shimozuru, et al., "A Life Log System that Recognizes the Objects in a Pocket", In Proceedings of the 6th Augmented Human International Conference, Mar. 9, 2015, pp. 81-88.
Strohmeier, et al., "zPatch: Hybrid Resistive/Capacitive eTextile Input", In Proceedings of the Twelfth International Conference on Tangible, Embedded, and Embodied Interaction, Mar. 18, 2018, pp. 188-198.
Sun, et al., "Investigating Flexible Textile-Based Coils for Wireless Charging Wearable Electronics", In Journal of Industrial Textiles vol. 50, Issue 3, Sep. 2020, 13 Pages.
Thomas, et al., "Where Does the Mouse Go? An Investigation into the Placement of a Body-Attached TouchPad Mouse for Wearable Computers", In Journal of Personal and Ubiquitous Computing vol. 6, Issue 2, Apr. 2002, pp. 97-112.
Vatavu, Radu-Daniel, "Smart-Pockets: Body-deictic gestures for fast access to personal data during ambient interactions", In International Journal of Human-Computer Studies vol. 103, Jul. 2017.
Villar, et al., "Project Zanzibar: A Portable and Flexible Tangible Interaction Platform", In Proceedings of the 2018 CHI Conference on Human Factors in Computing Systems, Apr. 21, 2018, 13 Pages.
Vogl, et al., "StretchEBand: Enabling Fabric-Based Interactions through Rapid Fabrication of Textile Stretch Sensors", In Proceedings of the 2017 CHI Conference on Human Factors in Computing Systems, May 6, 2017, 11 Pages.
Wagih, et al., "Dual-Receiver Wearable 6.78 MHz Resonant Inductive Wireless Power Transfer Glove Using Embroidered Textile Coils", In Journal of IEEE Access vol. 8, Feb. 3, 2020, pp. 24630-24642.

(56) References Cited

OTHER PUBLICATIONS

Wiese, et al., "Phoneprioception: Enabling Mobile Phones to Infer Where They Are Kept", In Proceedings of the SIGCHI Conference on Human Factors in Computing Systems, Apr. 27, 2013, pp. 2157-2166.
Wu, et al., "Capacitivo: Contact-Based Object Recognition on Interactive Fabrics using Capacitive Sensing", In Proceedings of the 33rd Annual ACM Symposium on User Interface Software and Technology, Oct. 20, 2020, pp. 649-661.
Wu, et al., "Fabriccio: Touchless Gestural Input on Interactive Fabrics", In Proceedings of the 2020 CHI Conference on Human Factors in Computing Systems, Apr. 25, 2020, 14 Pages.
Xu, et al., "eCushion: A Textile Pressure Sensor Array Design and Calibration for Sitting Posture Analysis", In Journal of IEEE Sensors Journal vol. 13, Issue 10, Oct. 10, 2013, pp. 3926-3934.
Yu, et al., "TUIC: Enabling Tangible Interaction on Capacitive Multi-touch Display", In Proceedings of the SIGCHI Conference on Human Factors in Computing Systems, May 7, 2011, pp. 2995-3004.
Zhong, et al., "ForceBoard: Subtle Text Entry Leveraging Pressure", In Proceedings of the 2018 CHI Conference on Human Factors in Computing Systems, Apr. 21, 2018, 10 Pages.
Grancaric, et al., "Conductive Polymers for Smart Textile Applications", In Journal of Industrial Textiles, vol. 48, Issue 3, Sep. 1, 2018, pp. 612-642.
Qu, et al., "Conductive Polymer Yarns for Electronic Textiles", In book of Electronic Textiles, Jan. 1, 2015, pp. 21-53.

* cited by examiner

SMART FABRIC THAT RECOGNIZES OBJECTS AND TOUCH INPUT

BACKGROUND

In the era of smart "things," computing is becoming increasingly accessible and ubiquitous through new interface technologies developed on everyday objects in homes and workspaces, as well as those worn on the body. Existing wearables (also referred to as wearable technology, fashion technology, smartwear, tech togs, skin electronics, or fashion electronics) are generally directed to smart electronic devices that are worn close to and/or on the surface of the skin, where they detect, analyze, and transmit information concerning body signals such as vital signs, and/or ambient data, which allows in some cases immediate biofeedback to the wearer.

For example, smartwatches and activity trackers are two popular forms of wearables that often provide a local touchscreen interface allowing certain input and output functions and an associated smartphone app for management and telemetry (such as long-term biomonitoring).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The principles described herein are related to (1) a piece of smart fabric having a plurality of sensors configured to generate sensing data; (2) a data processing circuitry configured to receive sensing data from the piece of smart fabric, and process and transmit the sensing data to a computing system, (3) a computing system having a machine learning module configured to receive and further process the received sensing data to build one or more prediction model(s) for recognizing an object placed next to the piece of smart fabric or a touch gesture applied onto the piece of smart fabric, and/or (4) a smart fabric system integrating the piece of smart fabric, the data processing circuitry, and the computing system to perform various functions, including (but not limited to) object recognition and gesture recognition.

The piece of smart fabric includes (1) a first layer having multiple resistive sensors and multiple capacitive sensors, and (2) a second layer having multiple inductive sensors and multiple NFC sensors. Each of the multiple resistive sensors corresponds to each of the multiple NFC sensors, respectively. Each of the multiple inductive sensors corresponds to each of the multiple NFC sensors, respectively.

In some embodiments, in the first layer, each of the multiple capacitive sensors includes a first piece of conductive fabric and a second piece of conductive fabric. In some embodiments, the conductive fabric includes non-metallic conductive fabric, such as a conductive polymer. In some embodiments, each of the multiple resistive sensors includes a piece of pressure sensing fabric, such as Velostat. Each piece of pressure sensing fabric of the resistive sensor is sandwiched between the first piece of conductive fabric and the second piece of conductive fabric of the corresponding capacitive sensor.

In some embodiments, the second layer includes multiple coils configured to act as both inductor coils for the multiple inductive sensors and sensor coils for the multiple NFC sensors. In some embodiments, every two adjacent coils among the plurality of coils overlap each other to improve the NFC sensors' effectiveness.

The piece of smart fabric is configured to be coupled to a circuitry for receiving and processing sensing data generated by the multiple sensors and transmitting the processed sensing data to a computing system. The circuitry includes a sensor module, a multiplexer module, and a processing module. The sensor module includes (1) a resistive sensing circuitry, (2) a capacitive sensing circuitry, (3) an inductive sensing circuitry, and (4) an NFC sensing circuitry, each of which is coupled to the multiplexer module and configured to receive respective sensing data the respective sensors of the piece of smart fabric and convert the respective sensing data into digital sensing data.

The multiplexer module includes one or more multiplexer(s) configured to selectively activate at least one of the (1) the resistive sensing circuitry, (2) the capacitive sensing circuitry, (3) the inductive sensing circuitry, and (4) the NFC sensing circuitry. In some embodiments, the one or more multiplexer(s) includes (1) one or more first multiplexer(s) configured to alternately activate the capacitive sensing circuitry or the resistive sensing circuitry; and/or (2) one or more second multiplexer(s) configured to alternately activate the inductive circuitry or the NFC sensing circuitry.

The processing module is coupled to the sensor module and configured to receive the digital sensing data from the sensor module and transmit the received digital sensing data to a computing system.

The computing system, receiving the digital sensing data, is configured to transform the digital sensing data into heatmap image(s). The heatmap image(s) are then used as training data for a machine learning module to train one or more predictive models. In some embodiments, the training data includes a plurality of sets of digital sensing data generated when at least one of a plurality of objects is placed next to the piece of smart fabric, and a first predictive model is trained to predict an unseen object placed next to the piece of smart fabric. Alternatively, or in addition, in some embodiments, the training data includes a plurality of sets of digital sensing data generated when at least one of a plurality of touch gestures is applied onto the piece of smart fabric, and a second predictive module is trained to predict an unseen touch gesture applied onto the piece of smart fabric.

After the one or more predictive models are trained, in response to receiving a set of sensing data when an unseen object is placed next to the piece of smart fabric or when a touch gesture is applied onto the piece of smart fabric, the computing system transforms the set of sensing data into one or more heatmap images. Based on the one or more heatmap images, the computing system predicts that the unseen object is one of the plurality of objects via the first predictive model, and/or predicts that the unseen touch gesture is one of the plurality of touch gestures via the second predictive model. In some embodiments, in response to the prediction that the unseen object is/is not a particular object or that the unseen touch gesture is/is not a particular touch gesture, the computing system further performs one of a plurality of actions.

For example, the piece of smart fabric may be implemented inside a user's pants pocket. The computing system first predicts which object is next to the piece of smart fabric via the first predictive model. In response to predicting that the unseen object is not a car key, the computing system may generate a notification, notifying the user that they may have forgotten to bring their car key. Alternatively, in response to predicting that the unseen object is a user's hand, the computing system may further predict which touch gesture is performed onto the piece of smart fabric via the second predictive model. In response to detecting a particular hand gesture, the computing system may further perform an action corresponding to the particular hand gesture.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
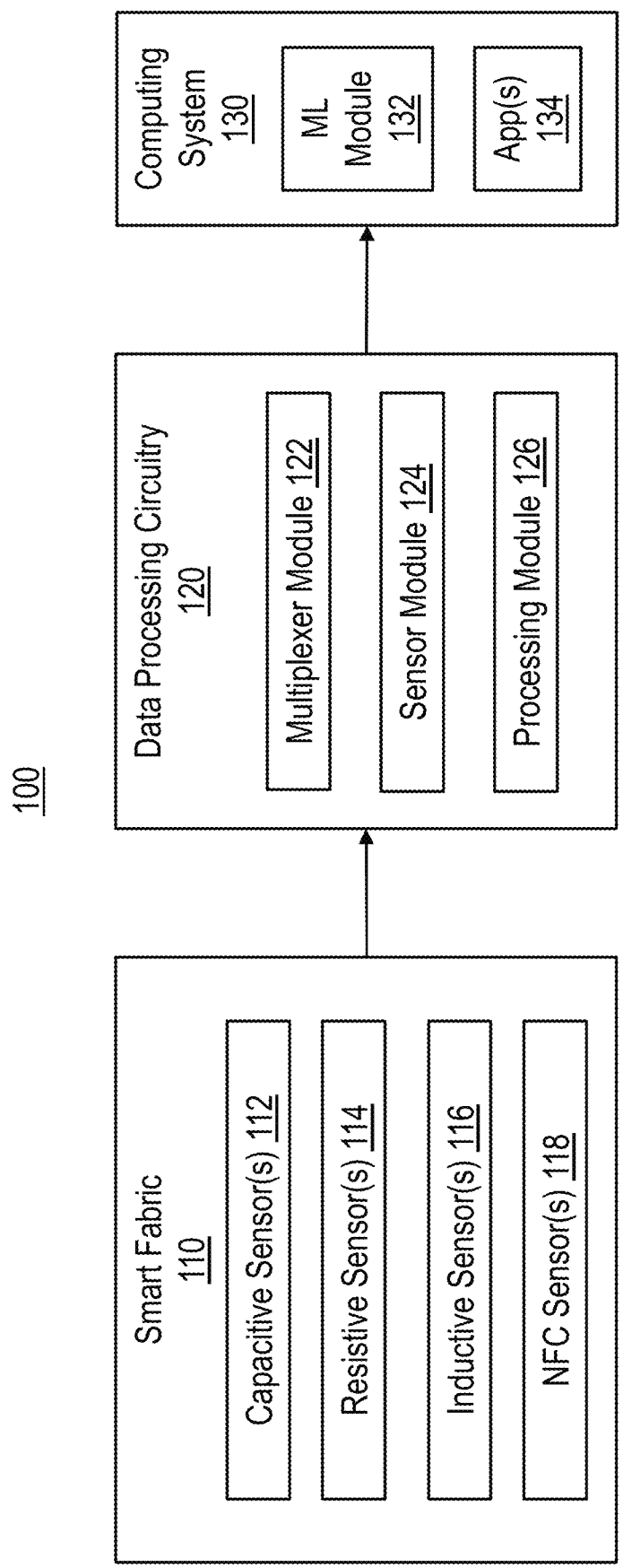
FIG. 1 illustrates an example of a smart fabric system including a smart fabric, a data processing circuitry, and a computing system.

The principles described herein are related to (1) a piece of smart fabric having a plurality of sensors configured to generate sensing data; (2) a data processing circuitry configured to receive sensing data from the piece of smart fabric, and process and transmit the sensing data to a computing system, (3) a computing system having a machine learning module configured to receive and further process the received sensing data to build one or more prediction model(s) for predicting an object placed next to the piece of smart fabric or a touch gesture applied onto the piece of smart fabric, and/or (4) a smart fabric system (also referred to as the "system") integrating the piece of smart fabric, the data processing circuitry, and the computing system to perform various functions, including (but not limited to) object recognition and gesture recognition.

The piece of smart fabric is configured to receive and sense different types of inputs, including explicit inputs and implicit inputs. An explicit input requires an explicit action from a user, such as touching or manipulating the piece of smart fabric. On the other hand, an implicit input does not require an explicit action from a user. For example, an implicit input may be a contextual interaction that tracks the objects in an interactive pocket.

Based on the sensing data received from the piece of the smart fabric, the system is capable of sensing touch and pressure and/or recognizing various items. For example, the system is capable of recognizing different 2D touch gestures (such as gestures commonly used on mobile devices and/or wearable devices. In some embodiments, the system is also configured to recognize different levels of pressure. In some embodiments, the system is also configured to recognize various daily objects that users normally carry in their pockets, including (but not limited to) metallic objects, non-metallic objects, and tagged objects.

The smart fabric may be used in parts of consumer products, such as (but not limited to) clothing, furniture, toys, and bags, which enables numerous applications that were not previously possible. For example, the smart fabric may be used in interactive pockets (e.g., on a pair of pants), which not only allow touch interactions to occur beyond smartphones, watches, or rings, but also allow users to interact with other computing devices (e.g., head-mounted devices, mobile phones, wall-mounted displays) in a comfortable, private, and always-available manner in ubiquitous computing environments. In some embodiments, the interactive pocket is configured to recognize different items in the pocket (e.g., keys, coins, electronic devices, plastic items, etc.), which further enables additional applications, such as activity tracking, placement-dependent notification, or providing new context to the information sensed from other devices.

In some embodiments, a piece of smart fabric is integrated with a pants pocket. The pocket-based system can detect user input and recognize everyday objects that a user carries in the pockets of clothing, such as keys, coins, electronic devices, or plastic items. By creating a new smart fabric and a new system integrating the new smart fabric, capable of detecting in-pocket touch and pressure and recognizing metallic, non-metallic, and tagged objects inside a pocket, a wide variety of subtle, eyes-free, and always-available inputs, as well as context-driven interactions in wearable scenarios, are enabled. In embodiments, multiple distinct types of sensing methods, including (but not limited to) inductive sensing, capacitive sensing, resistive sensing, and/or NFC sensing, are integrated into a multi-layer fabric structure, which may then be used in various parts of clothing or accessories, such as jeans pockets.

FIG. 1 illustrates an example of a system 100, including a piece of smart fabric 110, a data processing circuitry 120, and a computing system 130. The piece of smart fabric 110 includes one or more capacitive sensors 112, one or more resistive sensors 114, one or more inductive sensors 116, and one or more NFC sensors 118, though the invention is not limited to these types of sensors. Any other sensing techniques that are contact-based or working in a short-range may also be implemented. Each of the capacitive sensors 112, resistive sensors 114, inductive sensors 116, and the NFC sensors 118 is configured to generate and send sensing data to the data processing circuitry 120.

The data processing circuitry 120 includes a multiplexer module 122, a sensor module 124, and a processing module 126. A part of the multiplexer module 112 is configured to alternately activate different parts of the sensor module 124. When a particular part of sensor module 124 is activated, the corresponding sensors 112, 114, 116, and/or 118 are activated to generate respective sensing data corresponding to the activated part(s) of the sensor module 124. In some embodiments, another part of the multiplexer module 112 is configured to alternately allow the transmission of sensing data from at least one of the sensors 112, 114, 116, 118 to the corresponding sensor module 124.

The sensor module 124, receiving the sensor data, is configured to convert the received sensing data (originally analog sensing data) into digital sensing data. The processing module 126 receives the digital sensing data from the sensor module 124 and transmits the digital sensing data to the computing system 130. The transmission of the digital sensing data to the computing system 130 may be via a wired connection or a wireless connection, such as (but not limited to) BLE, Wi-Fi.

The computing system 130 has a machine learning module 132 and one or more additional application(s) 134. The machine learning module 132 is configured to process the received digital sensing data to build one or more predictive model(s). For example, one predictive model is configured to predict an unseen object that is placed next to the piece of smart fabric; and/or another predictive model is configured to predict an unseen touch gesture applied onto the piece of smart fabric. In some embodiments, in response to predicting that the unseen object is a particular object, or the unseen touch gesture is a particular touch gesture, the computing system 130 further performs a particular action, such as generating a notification via one of the application(s) 134.

Figure 2:
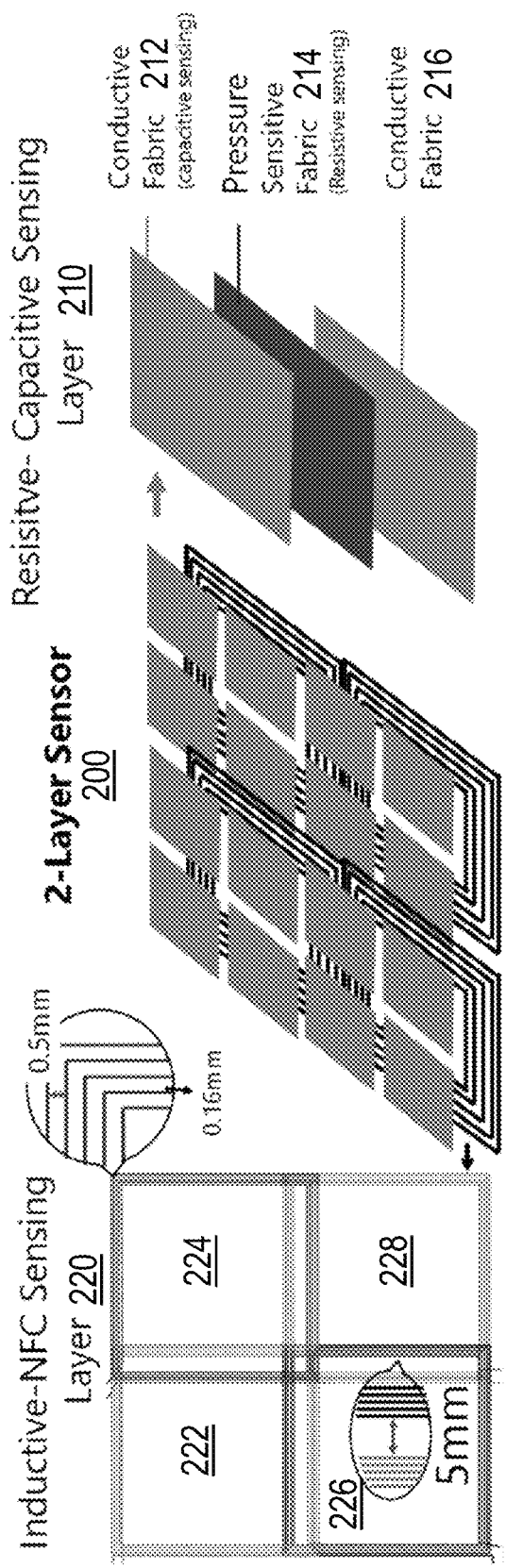
FIG. 2 illustrates an example of a structure of the piece of smart fabric.

FIG. 2 illustrates an example of a structure of the piece of smart fabric 200. As illustrated in FIG. 2, the piece of smart fabric 200 includes (1) a first layer 210 (also referred to as the "resistive-capacitive sensing layer") having multiple resistive sensors and multiple capacitive sensors, and (2) a second layer 220 (also referred to as the "inductive-NFC sensing layer") having multiple inductive sensors and multiple NFC sensors. Each of the multiple resistive sensors corresponds to each of the multiple NFC sensors, respectively. Each of the multiple inductive sensors corresponds to each of the multiple NFC sensors, respectively.

In some embodiments, in the first layer 210, each of the multiple capacitive sensors includes a first piece of conductive fabric 212 and a second piece of conductive fabric 216. In some embodiments, the conductive fabric 212, 216 includes non-metallic conductive fabric, such as a conductive polymer. Each of the multiple resistive sensors includes a piece of pressure sensing fabric 214, such as Velostat. In some embodiments, each piece of pressure sensing fabric 214 of the resistive sensor is sandwiched between the first piece of conductive fabric 212 and the second piece of conductive fabric 216 of the corresponding capacitive sensor. Each piece of the conductive fabric 212, 216, and each piece of pressure sensing fabric 214 serves as an electrode. The rows and columns of electrodes 212, 216 of the capacitive sensors are electrically separated, while the rows and columns of electrodes 214 of the resistive sensors are electrically connected. As illustrated, the resistive sensors and the capacitive sensors are arranged in a grid of 4×4, though the invention is not limited to this structure. For example, a greater number of capacitive sensors and/or resistive sensors (e.g., a grid of 4×8, 8×8, 16×16, etc.) may be implemented.

The second layer 220 includes multiple coils 222, 224, 226, 228 configured to act as both inductor coils for the multiple inductive sensors and sensor coils for the multiple NFC sensors. In some embodiments, every two adjacent coils among the plurality of coils overlap each other. Because an operation may become unreliable when the inductance of the coils is below 4 uH, it is advantageous to implement the coils 222, 224, 226, 228 to have an inductance of at least 4 uH, and about 5 or more traces are preferred. As illustrated, four coils are arranged in a grid of 2×2, and each coil is rectangular-shaped or square-shaped and has about 5 traces, though the invention is not limited to this structure. For example, a different shape of coils (e.g., circular shaped) or a greater number of coils (e.g., a grid of 2×4, 4×4, 8×8) may be implemented.

Each of the multiple inductive sensors 116 is configured to recognize metallic objects based on Faraday's law of induction. When an alternating electrical current is flowing through a L-C resonator, composed of the spiral-shaped coil of the inductive sensor and a capacitor, an electromagnetic field is generated around the inductive sensor. If a conductive object is brought into the vicinity of the inductive sensor, the electromagnetic field will induce an eddy current on the surface of the object, which in turn generates its own electromagnetic field, which opposes the original field generated by the inductive sensor. Therefore, a small shift in inductance can be observed through the inductive sensor. The amount of the shift is related to the resistivity, size, and shape of the object when it is in proximity to the inductive sensor.

Each of the multiple capacitive sensors 112 is configured to sense touch input and object recognition. Unlike inductive sensing, capacitive sensing works better for non-metallic objects, such as food items, dinnerware, plastic, and paper products. As a complement for inductive sensing, capacitive sensing is included for recognizing non-metallic objects (e.g., a hand sanitizer, a wallet), as well as sensing touch input, using a shared set of coplanar textile electrodes. An object can be recognized based on its capacitance footprint introduced by the change in the capacitance of electrodes, affected by the presence of an object. When the electrodes of the capacitive sensors 112 are in contact with a non-metallic object, the electric field applied from the electrodes causes a certain amount of electric displacement within the object. Objects with different permittivity have different effects on the amount of the electric displacement, which alters the capacitance of the object. The shift in the capacitance can be measured using a resonance-based approach, which is known to be precise and less susceptible to environmental noise.

Each of the multiple resistive sensors 114 is configured to sense a pressure based on the change in the resistance of a pressure-sensitive material (such as piezo-resistive material) when it is pressed or deformed. As an input method, this resistive sensing can be used for both sensing touch input and recognizing objects. For object recognition, unlike capacitive and inductive sensing, resistive sensing detects objects primarily based on the shape and amount of pressure exerted on the sensor by the objects. In the context of a pocket, using resistive sensing allows the system to infer the thickness of the objects since higher pressure can be observed with thicker objects. A combination of the sensing results from the capacitive sensors 112, inductive sensors 116, and resistive sensors 114 is proven to improve the accuracy of object recognition.

Each of the multiple NFC sensors 118 is configured to sense tagged objects. The NFC sensor uses alternating electromagnetic fields for sensing and transmitting data. When an NFC tag is triggered by an electromagnetic interrogation signal from a nearby antenna coil, it transmits its data to the sensor coil. In some embodiments, each NFC sensor 118 includes a coil that is laid out in a particular manner, such that the NFC sensor not only can detect tags, but also can function as an inductive sensor. For object recognition, inductive sensing usually requires the sensor coils to be arranged in a grid layout to detect the rough geometry of the contact area of an object. The grid arrangement also ensures the NFC sensor is effective across the full area. However, a tag may not be recognized when it is placed between two adjacent coils. To overcome this problem, in some embodiments, a small overlap (e.g., 5 mm) between two adjacent coils is introduced.

Figures 3A, 3B, 3C:
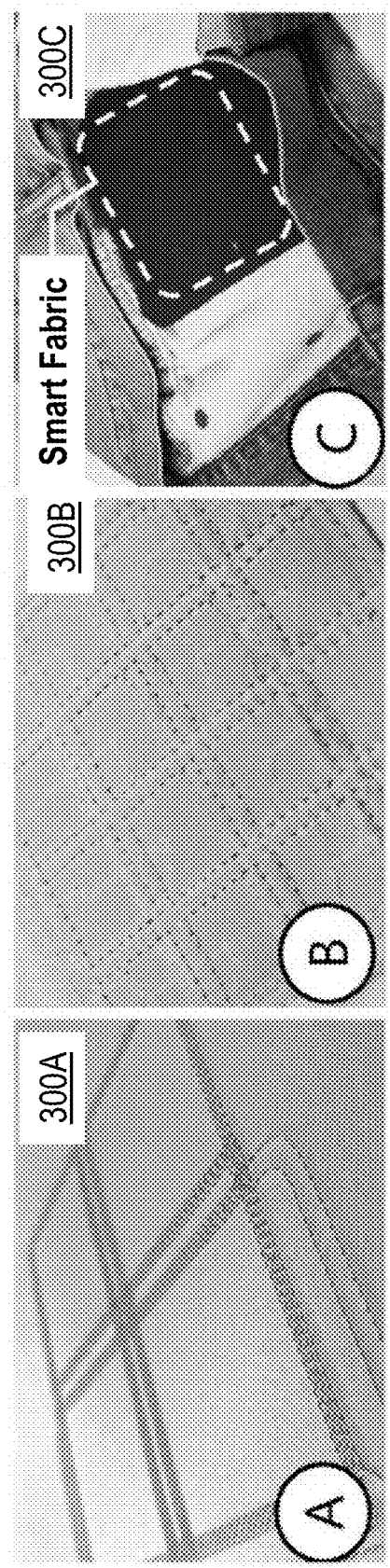
FIG. 3A illustrates a photo of an example of an inductive-NFC sensing layer.
FIG. 3B illustrates a photo of an example of a capacitive-resistive sensing layer.
FIG. 3C illustrates an interactive pocket having a piece of smart fabric attached therein.

FIGS. 3A-3C further illustrate photos of an inductive-NFC sensing layer 300A (corresponding to the second layer 220 of FIG. 2), a capacitive-resistive sensing layer 300B (corresponding to the first layer 210 of FIG. 2), and an interactive pocket 300C having a piece of smart fabric attached therein. The piece of smart fabric is made via different weaving, braiding, sewing, and embroidery techniques. As illustrated in FIG. 3A, the inductive-NFC sensing layer 300A is formed by stitching one or more conductive wires onto a non-conductive fabric substrate (e.g., a cotton substrate). To avoid short circuits, insulated wires (such as standard enamel coated copper wires) may be used.

As illustrated in FIG. 3B, the capacitive-resistive sensing layer 300B includes a top and bottom non-conductive fabric substrate (e.g., a cotton substrate, a felt substrate), and the electrodes are sandwiched between the top and bottom fabric non-conductive substrate (not shown). The two layers 300A and 300B are then stitched together into a single piece of fabric. In some embodiments, another layer of fabric is added at the bottom side of the piece of smart fabric as a ground shield. The bottom side is the side that is attached to the clothing; and the top side is the side that can directly interface with users' fingers or objects. In some embodiments, the resistive-capacitive sensing layer is disposed on top of the inductive-NFC sensing layer, and the ground shield layer is placed under the inductive-NFC sensing layer.

The smart fabric may be used in parts of consumer products, such as (but not limited to) clothing, furniture, toys, and bags, which enables numerous applications that were not previously possible. For example, as illustrated in FIG. 3C, a piece of smart fabric is used in interactive pockets 300C (e.g., on a pair of pants), which not only allow touch interactions to occur beyond smartphones, watches, or rings, but also allow users to interact with other computing devices (e.g., head-mounted devices, mobile phones, wall-mounted displays) in a comfortable, private, and always-available manner in ubiquitous computing environments.

Figure 4:
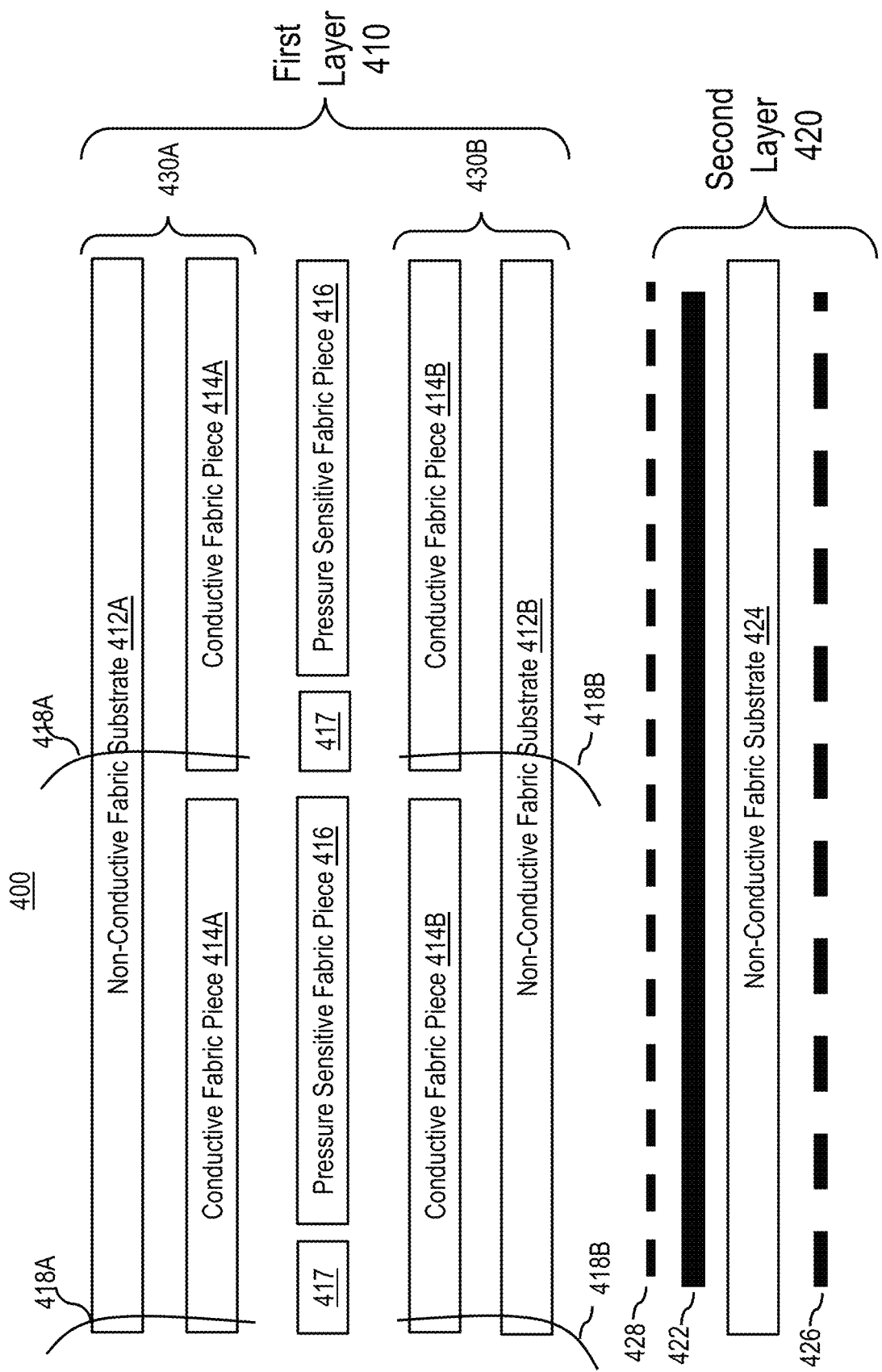
FIG. 4 illustrates a schematic diagram of an example of different layers of a piece of smart fabric.

FIG. 4 illustrates a schematic diagram of an example of different layers of a piece of smart fabric 400 in further detail. The piece of smart fabric 400 corresponds to the piece of smart fabric 200 of FIG. 2. The piece of smart fabric 400 includes a first layer 410 (corresponding to the first layer 210 of FIG. 2) and a second layer 420 (corresponding to the second layer 220 of FIG. 2). The first layer 410 includes multiple conductive fabric pieces 414A and 414B, which correspond to the first pieces of the conductive fabric 212 and the second pieces of the conductive fabric 216 of FIG. 2, respectively. The first layer 410 also includes multiple pressure-sensitive fabric pieces 416, which corresponds to the pressure-sensitive fabric piece 214 of FIG. 2.

In embodiments, to create the electrodes 414A and 414B for the first layer (i.e., the resistive-capacitive layer), a sheet of conductive fabric 414A, 414B is stitched onto a non-conductive substrate 412A, 412B (e.g., a cotton substrate). The conductive fabric may be a non-metallic material, such as a conductive polymer, to avoid interfering signals of other sensors. The stitches follow a grid layout of rectangular-shaped or square-shaped electrodes. The conductive fabric 414A, 414B faces the inner side of the sensor to allow a contact with the middle layer of a pressure-sensitive material 416. Following the stitches, the conductive fabric outside the electrode is cut. A cutting machine may be used to perform the cutting.

Further, one end of a connection line 418A, 418B is stitched at a corner (such as a top right corner) of each electrode 414A, 414B. The other end of the connection line is connected to a pin on the sensor board (not shown). In some embodiments, the connection line 418A, 418B is similar to the conductive wire used for stitching the coils in the inductive-NFC sensing layer. In some embodiments, another sheet of felt fabric is added to the outer side of the conductive fabric electrode layer 430A or 430B to prevent the conductive fabric electrode layer 430A, 430B from bending along the gap between two adjacent electrodes 414A, 414B.

The resistive-capacitive sensing layer 410 is completed by sandwiching a piece of rectangular-shaped or square-shaped pressure-sensitive fabric between each pair of conductive fabric electrodes 414A, 414B. When the conductive fabric electrode layers 430A, 430B are formed by a particular grid of conductive fabric electrodes (e.g., a grid of 4×4), the resistive sensing layer is also formed by a corresponding grid (e.g., a same grid of 4×4) of pressure-sensitive fabric pieces 416, such as Velostat. Further, in order for the pressure sensor to work properly, contact between the pressure-sensitive fabric pieces 146 and the connection lines 418A, 418B should be reduced or avoided. In some embodiments, a corner of each piece of the pressure-sensitive fabric 416 that corresponds to the corner of each piece of the conductive fabric 414A, 414B connected to the connection line 418A, 418B is removed. In addition, in some embodiments, the corner of each piece of the pressure-sensitive fabric 416 is replaced with a piece of non-conductive fabric 417 (e.g., felt fabric) to create insulation between the top and bottom electrodes 414A and 414B.

The piece of smart fabric 400 also includes a second layer 420 (i.e., the inductive-NFC sensing layer). The second layer 420 is formed by stitching one or more conductive wires 422 onto a non-conductive fabric substrate 424 (e.g., a cotton substrate). In some embodiments, the diameter of the wires 422 is about 161 um. In some embodiments, the wires 422 are applied to the fabric substrate using a fixation top thread 428. In some embodiments, the fixation top thread 428 is a Polyneon about #40 weight interlocked with a bottom thread 426 (polyester about #150 weight).

The piece of smart fabric 200 or 400 is configured to be coupled to a data processing circuitry for receiving and processing sensing data generated by the multiple sensors and transmitting the processed sensing data to a computing system. Figure SA illustrates a photo of an example of a data processing circuitry 500A configured to be coupled to a piece of smart fabric 550 (corresponding to the piece of smart fabric 400, or 200) via multiple pins. As illustrated, the data processing circuitry 500A includes a multiplexer module 520, a sensor module 530, and a processing module 540.

Figure 5A:
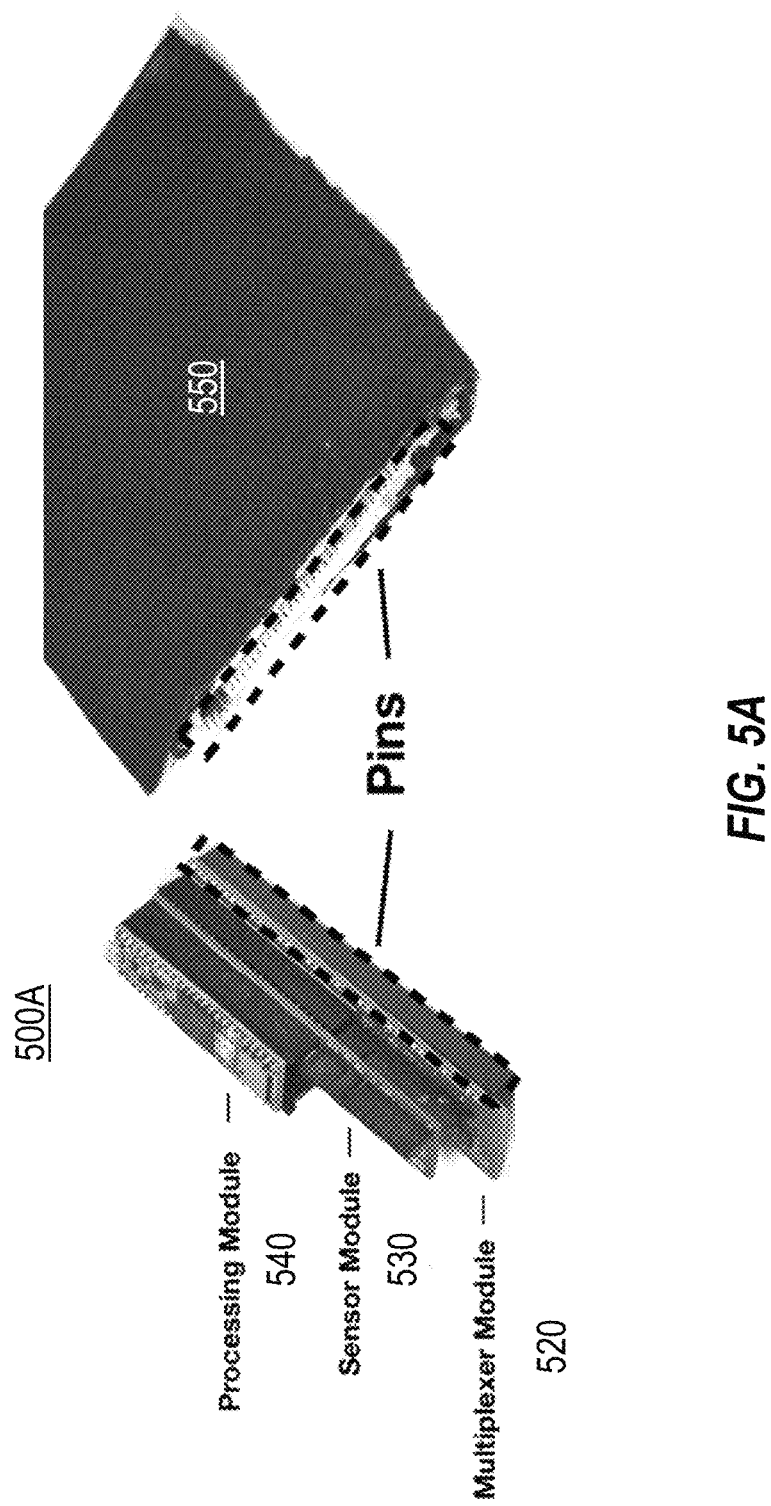
FIG. 5A illustrates a photo of an example of a data processing circuitry configured to be coupled to a piece of smart fabric.
Figure 5B:
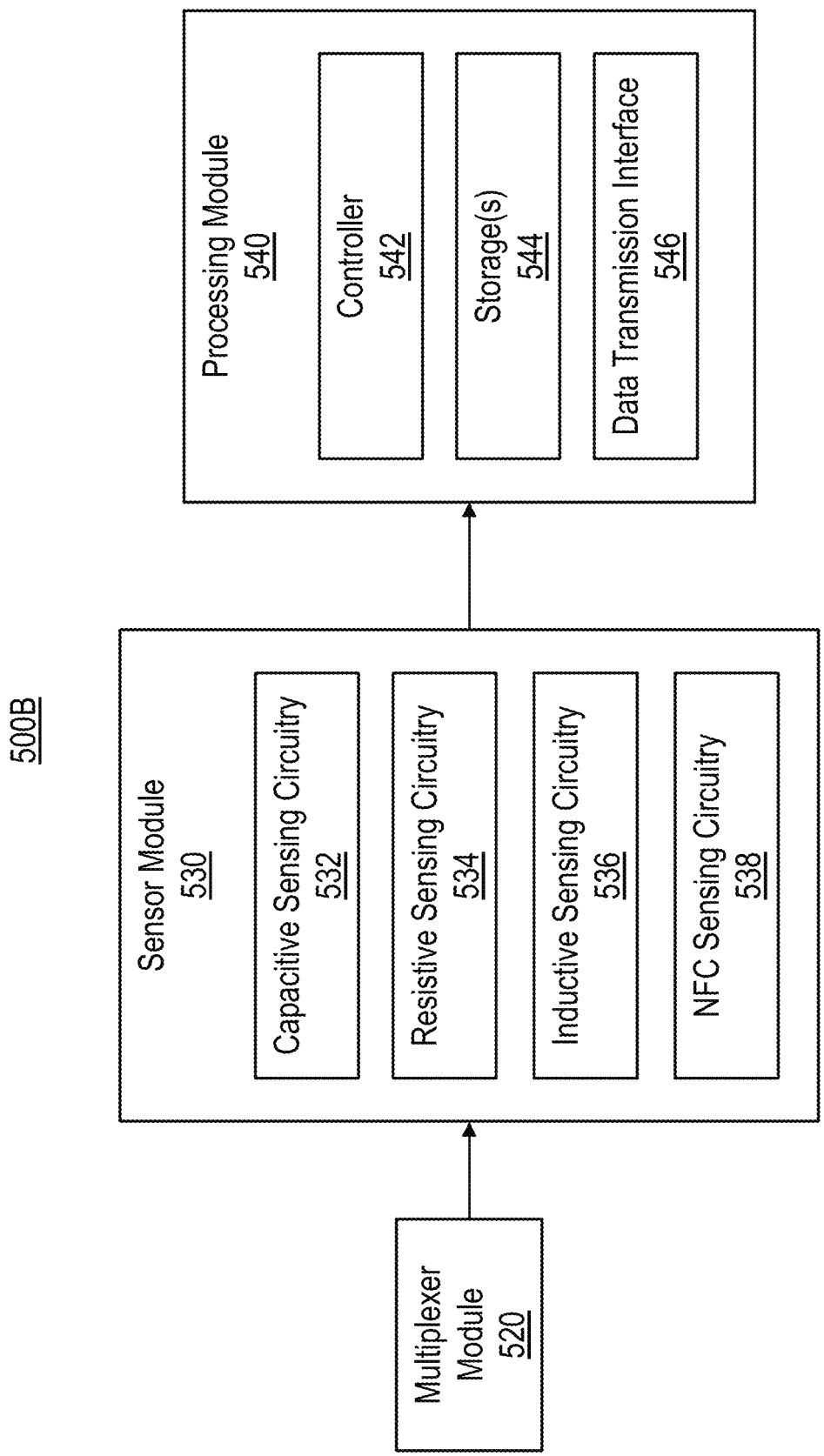
FIG. 5B illustrates an example of an architecture of a data processing circuitry.

FIG. 5B further illustrates an example of an architecture of a data processing circuitry 500B (corresponding to the data processing circuitry 500A of FIG. 5A), including a multiplexer module 520, a sensor module 530, and a processing module 540. In some embodiments, the sensor module 530 is connected to the piece of smart fabric 200, 400 through a pluggable interface implemented using pin headers. For example, an array of male headers may be soldered at the end of the sensors' connection lines and female headers are included on the sensor module 530 board.

As illustrated in FIG. 5B, the sensor module 530, coupled to the multiplexer module 520, includes a capacitive sensing circuitry 532, a resistive sensing circuitry 534, an inductive sensing circuitry 536, and an NFC sensing circuitry 538. The capacitive sensing circuitry 532 may include a capacitance to digital converter. The resistive sensing circuitry 534 may include a voltage divider circuit configured to monitor the change in the resistance of the pressure-sensitive fabric pieces. The inductive sensing circuitry 536 may include a multi-channel induction to digital converter. The NFC sensing circuitry 538 may include a contactless reader/writer. In some embodiments, to mitigate the fluctuation of the signal strength of NFC sensors caused by deformation of the coils, one or more programmable capacitor(s) may further be included in the NFC sensing circuitry. The programmable capacitor(s) are configured to dynamically adjust signal strength of the NFC sensors based on the coil inductance detected using the inductive sensing circuitry 536.

Each of the circuitries 532, 534, 536, or 538 is configured to power the respective sensors and to receive the sensing data from the respective sensors. For example, the capacitive sensing circuitry 532 is configured to power the capacitive sensors (including the conductive fabric pieces 414A, 414B) and receive sensing data from the capacitive sensors. The resistive sensing circuitry 534 is configured to power the resistive sensors (including the pressure-sensitive fabric pieces 416 and receive sensing data from the resistive sensors. Similarly, the inductive circuitry 536 is configured to power the inductor coils and to receive inductive sensing data; and the NFC circuitry 538 is configured to power the NFC sensor coils and to receive NFC sensing data.

In some embodiments, the inductive sensing circuitry includes a multi-channel inductance to digital converter configured to receive a plurality of channels of sensing data and convert the received sensing data into digital sensing data. In some embodiments, each of the plurality of channels corresponds to each of the plurality of coils. For example, when four coils are implemented, a four-channel inductance to digital converter is used. The use of the multi-channel inductance to digital convert reduces the total number of multiplexers used, which is advantageous, because multiplexers introduce parasitic impedance that degrades performance.

The multiplexer module 520 includes one or more multiplexers configured to alternately switch the circuitries 532, 534, 536, 538 on and off. In some embodiments, one or more first multiplexer(s) are implemented to alternately switch the capacitive sensing circuitry 532 and the resistive sensing circuitry 534 on and/or off, and one or more second multiplexer(s) are implemented to alternately switch the inductive sensing circuitry 536 and the NFC sensing circuitry 538 on and/or off. In some embodiments, one or more third multiplexer(s) are implemented to alternately send sensing data from a subset of multiple sensors to a particular circuitry 532, 534, 536, or 538. In embodiments, one of the third multiplexer(s) is configured to switch among the multiple NFC sensor coils; and one or more of the third multiplexer(s) is configured to switch among the multiple capacitive and resistive sensors. For example, when four coils are implemented in the piece of smart fabric, a two-channel 4:1 multiplexer may be implemented as an radio frequency (RF) switch. As another example, when a 4×4 grid of capacitive and resistive sensors are implemented, four two-channel 4:1 multiplexers may be implemented to hand the 16 capacitive sensors and the 16 resistive sensors.

The data processing circuitry 500B also includes a processing module 540 coupled to the sensor module 530. The processing module 540 includes a controller 542 (e.g., a microcontroller unit), one or more storage(s) 544 (such as, a RAM or a ROM), and a data transmission interface 546. The controller 542 is configured to receive and/or read the sensing data from all the sensors at a predetermined frequency (e.g., 10 MHz).

The storage(s) 544 is configured to permanently or temporarily store the digital sensing data received from the sensor module 530. The data transmission interface 546 is configured to transmit the digital sensing data to a computing system (not shown), e.g., the computing system 130 of FIG. 1, via a wired communication or a wireless communication, such as BLE or Wi-Fi. The computing system may be a user's laptop, a mobile device, etc.

For each predetermined time interval, the processing module 540 reports a grid (e.g., 4×4) of capacitance values, a grid (e.g., 4×4) of pressure values, a grid (e.g., 2×2) of inductance values, and a grid (e.g., 2×2) of NFC value to the computing system 130. All the received data, except that from NFC, is used for training one or more machine learning models for object or touch gesture recognition.

Figure 6:
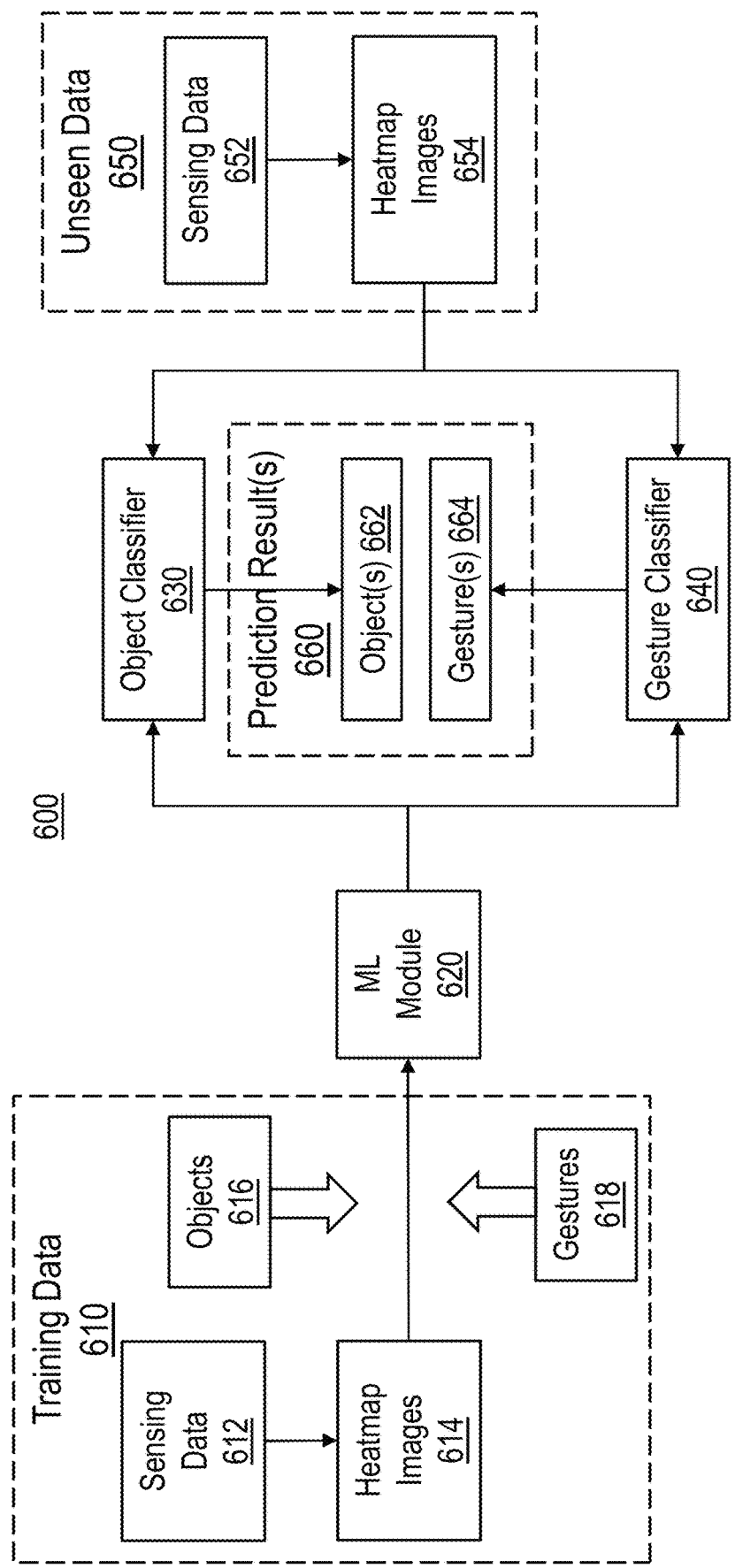
FIG. 6 illustrates a schematic diagram of a process that the computing system performs for training one or more machine learning models and/or using the trained machine learning models to recognize an object or a touch gesture.

FIG. 6 illustrates a schematic diagram of a process 600 that the computing system 130 performs for training one or more machine learning models and/or using the one or more machine learning models to recognize an object or a touch gesture. As illustrated in FIG. 6, raw digital sensing data 612 is transformed into heatmap images 614. The digital sensing data 612 is generated and received when at least one of a plurality of objects is placed next to the piece of smart fabric 200, 400.

In some embodiments, the raw digital sensing data 612 is smoothed using a median filter with a sliding window having a predetermined size (e.g., 10) before the raw digital sensing data is used for object recognition. In some embodiments, the raw digital sensing data 612 is processed using a 2D noise profile to reduce background noise. The 2D noise profile is created by averaging the sensor readings at multiple locations of the sensors with a sliding window of a predetermined size (e.g., 10). In some embodiments, for each of the predetermined time interval, the noise profile is updated if the deltas between current sensor values and the previous ones are classified as noise by a machine learning model. In some embodiments, upon the presence of an object or hand, the sensing data may be upscaled to a predetermined size (e.g., 240×240), using linear interpolation. The upscaled grid of sensing data can then be presented as a heatmap image.

Figures 7A, 7B, 7C, 7D:
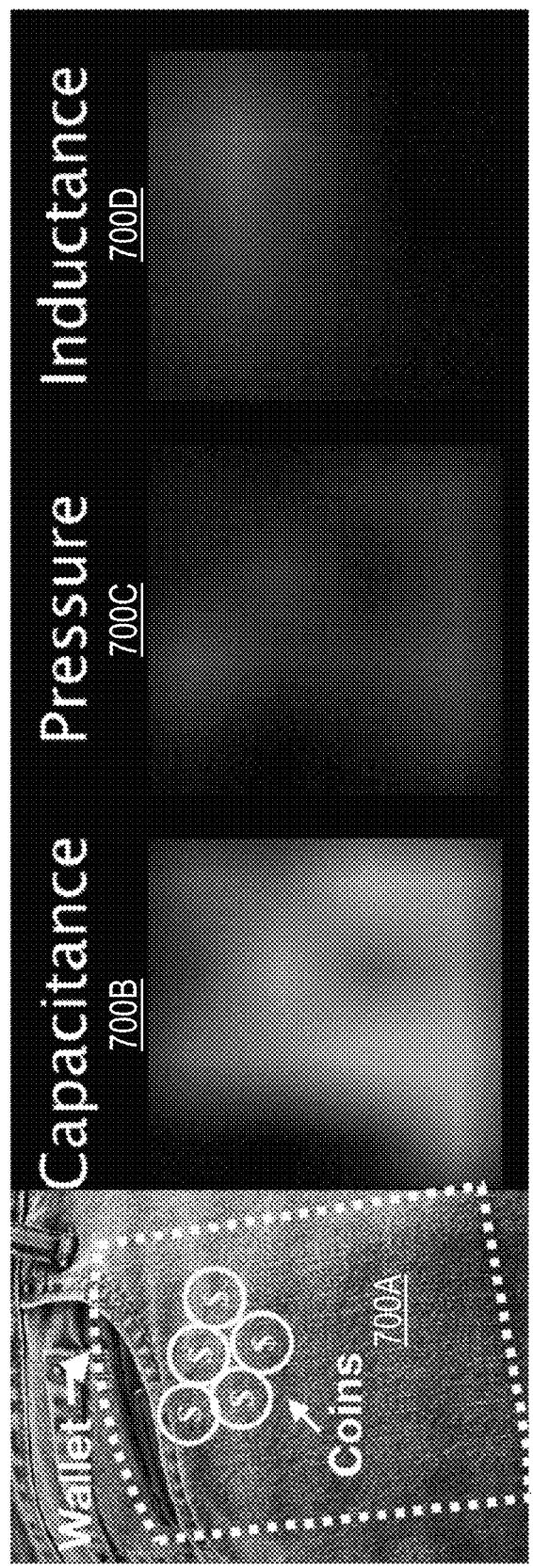
FIG. 7A illustrates an example of a scenario, in which a wallet containing a few coins was placed in an interactive pocket.
FIG. 7B illustrates an example of a heatmap image generated from sensing data received from a capacitive sensing circuitry when the wallet of FIG. 7A is placed in the interactive pocket.
FIG. 7C illustrates an example of a heatmap image generated from sensing data received from a pressure sensing circuitry when the wallet of FIG. 7A is placed in the interactive pocket.
FIG. 7D illustrates an example of a heatmap image generated from sensing data received from an inductive sensing circuitry when the wallet of FIG. 7A is placed in the interactive pocket.

FIG. 7A illustrates an example of a scenario, in which a wallet containing 5 coins was placed in an interactive pocket 700A having a piece of smart fabric therein. FIGS. 7B-7D illustrate three examples of different heatmap images 700B, 700C, 700D generated from sensing data received from a capacitive sensing circuitry (e.g., circuitry 532 of FIG. 5B), a pressure sensing circuitry (e.g., circuitry 534 of FIG. 5C), and an inductive sensing circuitry (e.g., circuitry 536 of FIG. 5C) respectively when the wallet (containing 5 coins) were placed in the interactive pocket 700A.

Turning back to FIG. 6, each of the heatmap image(s) 614 corresponds to an object 616 or a touch gesture 618. The heatmap images 614 and the corresponding objects 616 and/or touch gestures 618 are then used as training data for a machine learning module 620 (corresponding to the machine learning module 132 of FIG. 1) to train one or more predictive models 630 or 640 (also referred to as "machine learning models"). In some embodiments, an object classifier 630 (also referred to as the "first predictive model") is trained to predict an unseen object placed next to the piece of smart fabric. Alternatively, or in addition, a gesture classifier 640 (also referred to as the "second predictive model") is trained to predict an unseen touch gesture applied onto the piece of smart fabric.

In some embodiments, for the data collected from each type of sensors, multiple material-related features, pressure-related features, and shape-related features are derived. For example, material-related features or pressure-related features include (but are not limited to) statistical functions and/or ten-fold stats. The statistical functions include (but are not limited to) sum, mean, max, binned entropy, local maximum number, median, quantiles, count above mean, count below mean, variance, and/or absolute energy of the object's pixel value. The the-fold stats include (but not limited to) sort and divide the object's pixel values into 10 folds and average the values for each fold, divide grayscale values into ten intervals and count the number of the pixels in each interval. The features that are invariant to the orientation of the contact area of the object are selected to train a machine learning model. Various machine learning technologies may be implemented to train the machine learning models. In some embodiments, Random Forest is found to be accurate, robust, and computationally efficient in applications involving small objects that may be placed in a pocket.

In some embodiments, when a hand is recognized, the computing system 130 is switched to the gesture recognition mode. In the gesture recognition mode, the computing system 130 assumes the palm remains in a relatively stable position. As such, background subtraction is implemented to remove the palm in the heatmap image. The computing system then detects moving fingers by looking for objects smaller than a threshold size. Gestures are recognized if the fingers' moving distance exceeded a certain threshold. The resistive sensors are configured to detect the fingers' pressing of the piece of smart fabric.

In some embodiments, the computing system 130 enables at least five input modalities in one piece of smart fabric, including (but not limited to) (1) object recognition, (2) object gesture, (3) touch gesture, (4) pressure input, and/or (5) activity tracking.

After the one or more predictive models 630, 640 are trained, in response to receiving a set of sensing data 652 when an unseen object is placed next to the piece of smart fabric 200, 400 or when a touch gesture is applied onto the piece of smart fabric 200, 400, the computing system 130 transforms the set of sensing data 652 into one or more heatmap images 654. The process of transforming the set of sensing data 652 into heatmap images 654 may also include processing the set of sensing data 652 using the 2D noise profile to reduce background noise and upscaling the processed sensing data to the predetermined sized heatmap images 654. Based on the one or more heatmap images 654, the computing system 130 predicts that the unseen object is one of the plurality of objects via the object classifier 630, and/or predicts that the unseen touch gesture is one of the plurality of touch gestures via the gesture classifier 640.

In some embodiments, the computing system 130 is further configured to allow customization of object recognition. For example, the computing system 130 may have a default set of registered objects that are recognizable by the object classifier 630. The computing system 130 is further configured to allow customization of the default set of registered objects, including adding an object to or removing an object from the default set of registered objects. Once a new object is added, the computing system 130 may use transfer learning to continue to train the existing object classifier 630 to start to recognize the new object.

In some embodiments, in response to the prediction that the unseen object is/is not a particular object or that the unseen touch gesture is/is not a particular touch gesture, the computing system 130 further performs one of a plurality of actions.

For example, the piece of smart fabric 200, 240 may be implemented in an interactive pocket. The object recognition function that is capable of recognizing different objects carried in the interactive pocket enables richer contextual interactions in wearable scenarios beyond what is currently offered by existing wearable devices, such as smart watches or head-mounted displays. For example, knowing what the user has or does not have in their pocket, the user's personal computer or mobile device can provide better personal assistance. When the system detects coins (circular shaped metallic objects), the system may further determine that the user has changes to pay for street parking or to purchase an item from a vending machine. When the system does not detect coins, a reminder may be sent to the user before they travel.

Figures 8A, 8B:
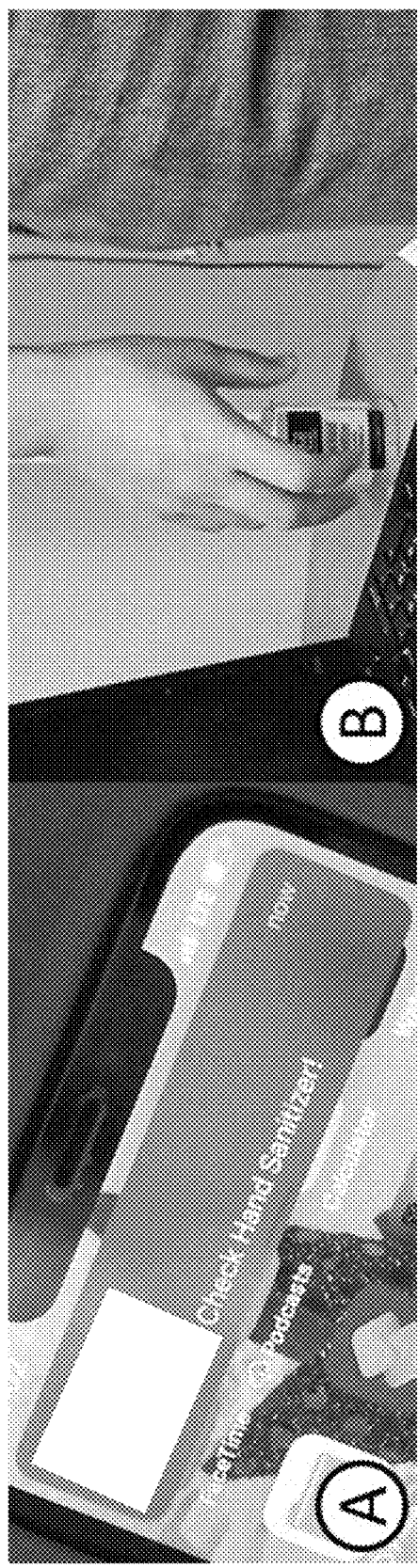
FIGS. 8A and 8B illustrate an example of a scenario, in which the piece of smart fabric system is configured to determine whether a bottle of hand sanitizer is in the interactive pocket, and in response to determining that the bottle of hand sanitizer is not in the interactive pocket, generate a notification, reminding the user.

FIGS. 8A and 8B illustrate another example of a scenario, in which the system is configured to determine whether a bottle of hand sanitizer is in the interactive pocket based on the sensing data received from the interactive pocket. When it is determined that the hand sanitizer is not in the interactive pocket, a user may be reminded that they should carry a hand sanitizer.

In some embodiments, the system is configured to differentiate between a hand and other objects. Since the pocket is where hands can naturally rest, the system provides a useful input mechanism for a user to interact with computing devices. For example, a user can perform a touch gesture inside the pocket to interact with a head-mounted display or a smartwatch. This subtle and eyes-free input method can be useful, especially in public settings, where repeatedly interacting with the device might be considered inappropriate. Further, the system may also allow a user to interact with a smartwatch using the same hand that wears the smartwatch, which is beneficial in situations when the other hand is occupied by other tasks (e.g., holding an object).

In some embodiments, the computing system is further configured to recognize pressure input. In addition to 2D touch gestures, different pressures can be detected to enable a new dimension of interaction with computing devices through the interactive pocket. In some embodiments, a user can perform directional swipes with multiple levels of pressure, including at least a low pressure and a high pressure. Unlike pressure input on a rigid-surface touch panel, where an amount of force is only perceived through a user's fingertips, pressing inside a pocket allows the user to feel the force through both their fingertips and body (e.g., thigh), which not only expands the vocabulary of touch gestures, but also enriches the haptic feedback that the user can perceive for better supporting eyes-free inputs.

Figures 9A, 9B:
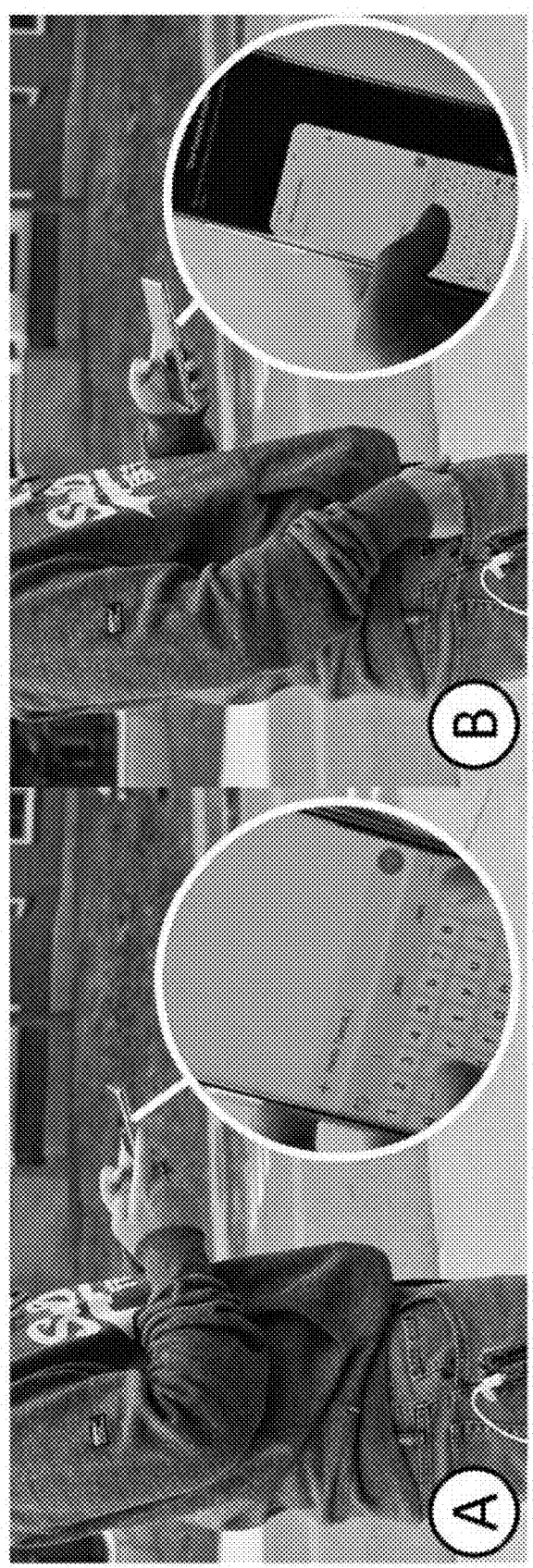
FIGS. 9A and 9B illustrate an example of a scenario, in which when the piece of smart fabric system detects a hand inside the interactive pocket while a smart phone is being used, the smart phone is automatically switched into a single-hand mode.

In some embodiments, the system is further configured to recognize activity tracking. FIGS. 9A and 9B illustrate an example of a scenario, in which the piece of smart fabric system detects a hand inside an interactive pocket while a smartphone is being interacted with. In response, the system determines that the user is currently using the smartphone one-handedly, which can, in turn, switch the smartphone to a single-hand mode (e.g., displaying a narrower keyboard for one-handed typing).

As another example, in social scenarios, body language expressed by a user putting their hand in a pant pocket is often associated with certain social meanings. For example, placing a hand in a pocket when standing can be considered as a sign of low confidence. The system may be set up to notify the user about their hand position through the vibration of a mobile device (e.g., a smartwatch, a smartphone).

Figures 10A, 10B:
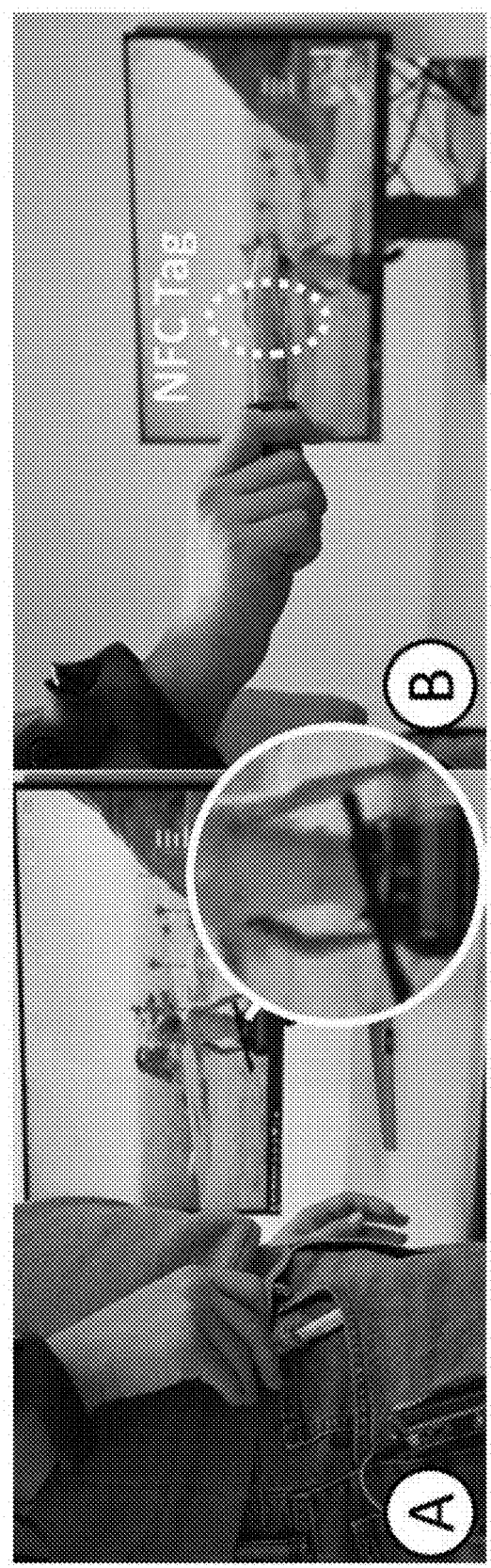
FIGS. 10A and 10B illustrate an example of a scenario, in which a user encounters a weapon in a VR game, and the piece of smart fabric system allows the user to place a weapon token in the interactive pocket.

Further, in VR games, tagged objects (NFC) can be used as tangible tokens to enable a more immersive gaining experience by allowing the user to physically interact with a virtual items in the digital world. FIGS. 10A and 10B illustrate an example of a scenario, in which the user encounters a weapon in a game. In such a case, the user could pick the weapon up and place its physical counterpart (e.g., a weapon token) in their interactive pocket.

In some embodiments, a gestural input inside the interactive pocket may be recognized using an object. Gesturing inside a pocket using an object provides an alternative way to interact with a computing device. Additionally, the contextual information provided by the pocket (e.g., what object is used to perform the gesture) allows the same gesture to trigger an action uniquely associated with the detected object. For example, rubbing the phone against the pocket can be used to quickly trigger a command on the phone. Another benefit of this type of input is that the gestures cannot be easily seen by nearby people, which can be useful in scenarios where interacting with the touchscreen in a public setting is not preferred by a user. For example, with the system described herein, a user can rub the phone to switch it to guest mode before the user lends the device to a friend. In some embodiments, the same gesture performed using a different object may trigger a different action. For instance, a user can turn on/off the noise cancellation feature of their wireless earphones by rubbing the charging case.

Figures 11A, 11B:
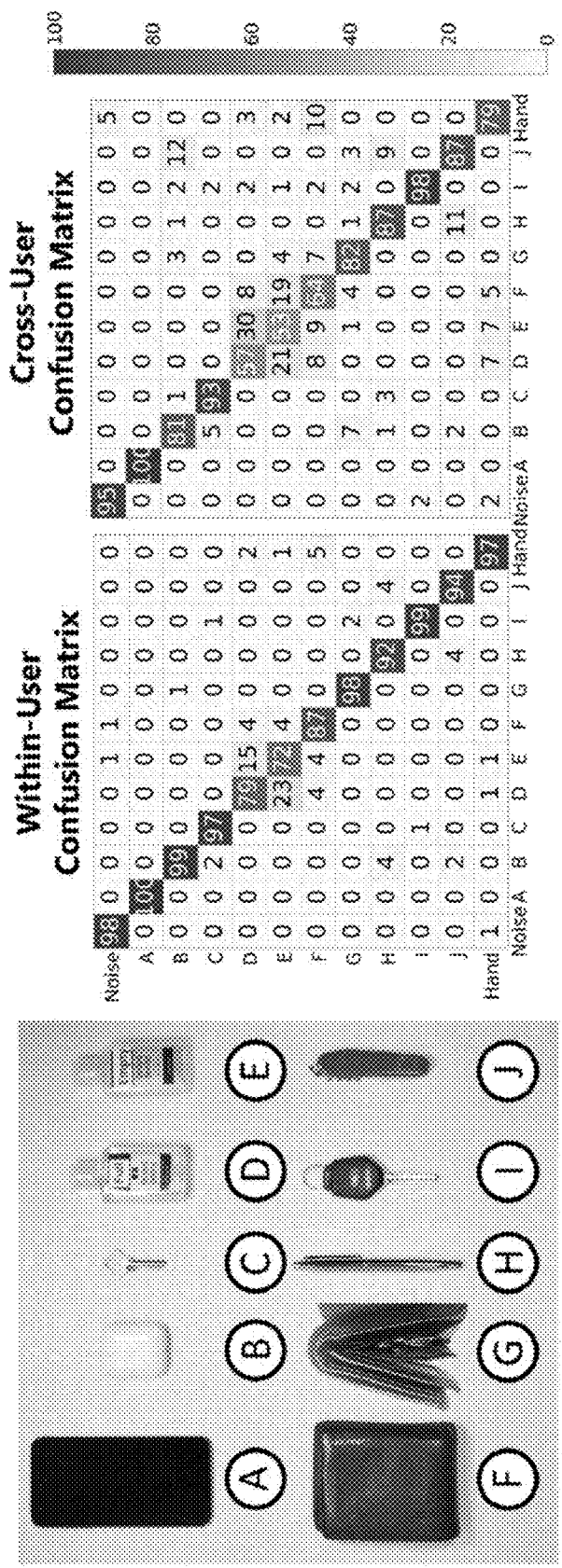
FIG. 11A illustrates examples of objects that are used in an experiment for testing the accuracy of an object recognition machine learning model.
FIG. 11B illustrates the accuracy of the object recognition machine learning model based on the experiment.
Figure 11C:
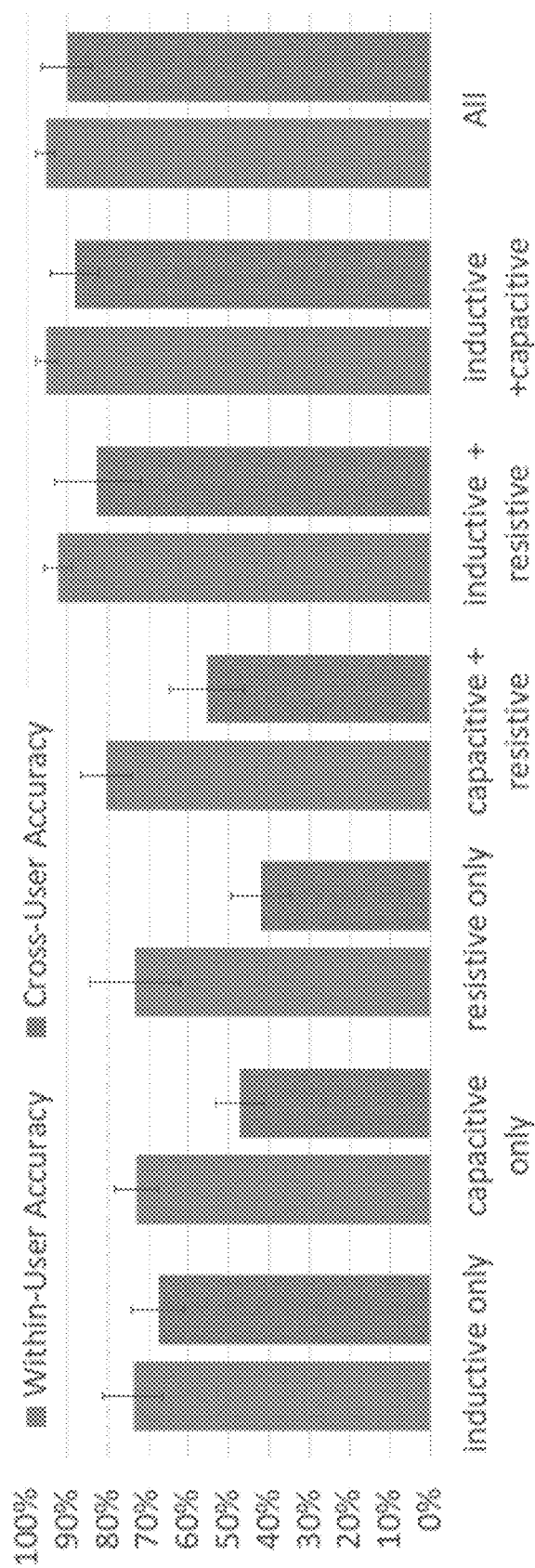
FIG. 11C illustrates the accuracy of the object recognition machine learning model when different combinations of types of sensors are used.

Experiments have been performed to test the accuracy of the object recognition function described herein. FIGS. 11A-11C illustrate the results of the experiments, indicating the object recognition principles described herein function well as intended. As illustrated in FIG. 11A, during experiments, 10 different objects that are often carried by people in their pants pocket are tested, including (A) a smartphone, (B) an earbuds charging case, (C) a house key, (D) a full bottle of hand sanitizer, (E) an empty hand sanitizer bottle, (F) a wallet without coins, (G) a wallet with coins, (H) a pen, (I) a car key, and (J) a multi-function tool. These tested objects have different geometrical properties (e.g., size and shape) and material properties (e.g., metallic or plastic). Some of these tested objects are metallic (e.g., a house key) or non-metallic (e.g., the hand sanitizer and its bottle, the wallet without coins), while most of them contain a mixture of metallic and non-metallic materials (e.g., the pen, the multi-function tool, the car key, the earbuds charging case, and the smartphone. The sanitizer bottles with and without hand sanitizer and the wallets with and without coins are purposefully included to measure how well the system can recognize different statuses of a container. A random number between 5-10 coins are placed in the wallet G. Participants' hands are also included in the experiments to test how well the system can differentiate between the hand and all the other tested objects.

During the experiments, participants perform various tasks in a standing position to simulate common use scenarios of a pants pocket. Participants are asked to place each of the tested objects in their pocket 10 times at a random order. Further, to test whether user activities such as walking may cause confusion to the system between the tested objects, noise data is collected by having participants walk for 30 seconds. In total, 1100 samples (=10 participants, 11 objects (including the 10 objects and the participant's hand)×10 repetitions) for analysis.

FIG. 11B illustrates the results of the analysis, including a confusion matrix of within-user accuracy and a confusion matrix of cross-user accuracy. Within-user accuracy is the measurement of prediction accuracy, where training and testing data are from the same participant. For each participant, a five-fold cross-validation is performed, where ⅘ of the data is used for training, and the remaining data is used for testing. The left side of FIG. 11B shows the confusion matrix of the within-user accuracy. As illustrated, the overall within-user accuracy is then calculated by averaging the results from all the participants. The experiment yielded an accuracy of 92.3% (SD=3.2%) within-user.

A close look at the result reviewed that most objects received an accuracy of over 90%. The noise could be reliably distinguished from the tested objects and hand. The major source of error was from the confusion of the system between the full and empty bottle of hand sanitizer. When the data associated with the empty hand sanitizer bottle is removed, the within-user accuracy is increased to 95.5% (SD=2.2%). Aside from the empty hand sanitizer bottles, the system sometimes confused the multi-functional tool with the pen, which is primarily due to the similarity in the shape and material of these two objects. This confusion may be improved by improving the 2D resolution of the sensor, e.g., increasing the number of sensors in a same area.

A cross-user accuracy (also referred to as universality) measures how well the model works across different users. The cross-user accuracy is calculated by using the data from nine participants for training and the remaining one for testing. The overall accuracy was then calculated by averaging the accuracy of all the ten combinations of training and test data. The result yielded an 81.3% accuracy (SD: 6%). The right side of FIG. 11B shows the confusion matrix of the across-user accuracy. Similar to the within-user condition, the full and empty hand sanitizer bottles contributed to most of the classification errors. When data associated with the empty hand sanitizer bottle is removed, the cross-user accuracy is increased to 90.3% (SD: 6.2%), which suggests that it is technically feasible to use a general model across different users without a significant impact on the type of objects that the system can correctly recognize.

Further, FIG. 11C illustrates that the recognition accuracy is related to how the data received from different sensors are combined. As illustrated, none of any single type of sensors could reliably handle a diverse set of objects. However, the combination of the sensors improves accuracy significantly. For example, resistive sensing alone only has an accuracy of 42.9% (SD=6.63%). Combining inductive sensing with any one of the capacitive sensing and resistive sensing significantly increases the recognition accuracy to above 80%. The performance is further improved when all three types of sensing (i.e., inductive sensing, capacitive sensing, and resistive sensing) are used.

Figure 12B:
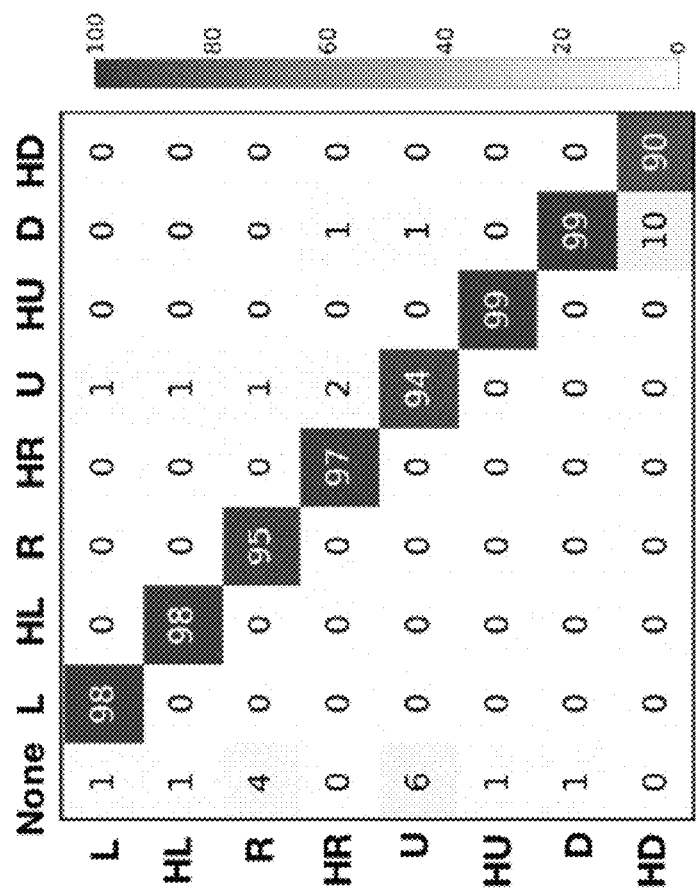
FIG. 12B illustrates the accuracy of the touch gesture recognition machine learning model based on the experiment.
Figure 12A:
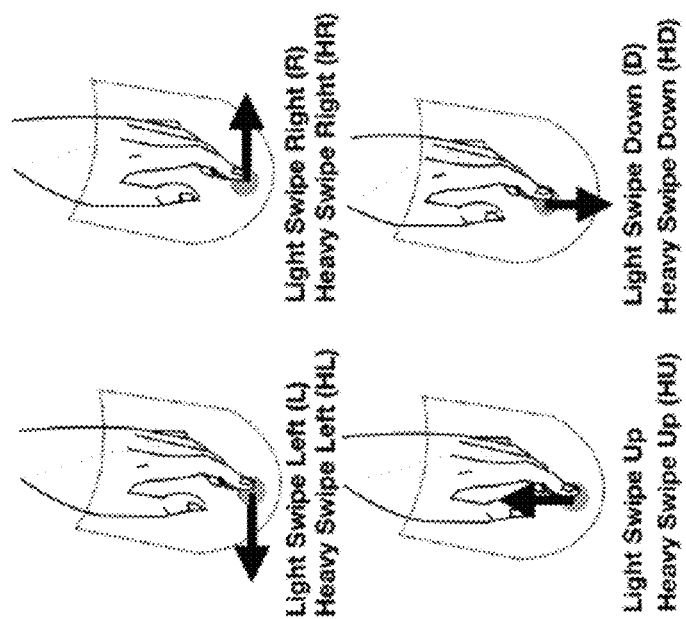
FIG. 12A illustrates examples of touch gestures that are used in an experiment for testing the accuracy of a touch gesture recognition machine learning model.

Experiments are also performed to evaluate the accuracy of gesture recognition and pressure levels. FIGS. 12A-12B illustrate the process and the results of the experiment, indicating that the gesture recognition principles described herein also function as well as intended. As illustrated in FIG. 12A, the experiment includes four directional strokes (left, right, up, and down) that are commonly used on touchscreen devices or for navigating large workspaces (e.g., a map or long list). For each tested gesture, participants were asked to perform the gesture with low and high pressure. Similar to the experiments of object recognition, the participants perform the tasks in a standing position.

Before the experiments, the participants were given several minutes to learn the 8 gestures (=4 (left, right, up, and down gestures)×2 (low pressure, high pressure)). During the short training session, the system is configured to customize the pressure threshold for each participant, because the perception of low pressure versus high pressure varied across different people. After this short training session, each participant performed a gesture inside the pocket using their right hand. The order of the tested gestures was randomly assigned. Each gesture was repeated 10 times. In total, 1500 samples (10 participants×4 gestures×2 forces×10 repetitions) were received. Real-time recognition accuracy was recorded for analyzing the results.

FIG. 12B illustrates the result of the experiment, including a confusion matrix. As illustrated, overall, the system yielded an average gesture recognition accuracy of 96.1% (SD=3%). The confusion matrix shown in FIG. 12B suggests that 6 out of the 8 tested gestures could be correctly recognized by the system with an accuracy of over 95%. Some of the gestures were harder to perform than the others. For example, users with long nails often performed the light swipe up (94%) by scratching the sensor using the nail. This has caused difficulties for the system to properly detect the touch gesture. Further, performing the swipe down gesture (90%) using two levels of pressure was more challenging than the other tested gestures because participants naturally exerted more force when pushing the finger downwards even in the low-pressure condition. It was thus more challenging for the system to distinguish between the two swipe down gestures with different levels of pressure.

Experiments for evaluating the NFC sensors are also performed for tags positioned at different positions and distances to the sensors. Two common types of NFC tags, namely card and key tags, are tested. The distance between a tag and the sensor was controlled by attaching the tag to an acrylic sheet of a certain thickness, which allows the tags to be placed right next to an object (e.g., smart fabric). Further, for each tag, three different distances (i.e. near, medium, and far) are used in the experiment. In the near condition, the tag was placed in a direct contact with the piece of smart fabric. For the key tag, the medium and far conditions are controlled at 3 mm and 6 mm (about the thickness of a smartphone), respectively. Because the sensor signals are stronger for the card, the medium and far conditions are increased to 10 mm and 20 mm for the card, which is about the thickness of a wallet. Further, each tag was also placed at different locations relative to the piece of smart fabric. In particular, each tag is placed in the center as well as at the four corners of the piece of smart fabric because sensor signals are generally weaker at the edges of the coils. Each test is repeated 3 times, and 900 samples (10 participants×2 tags×5 locations×3 distances×3 repetitions) are collected for analysis.

Figure 13:
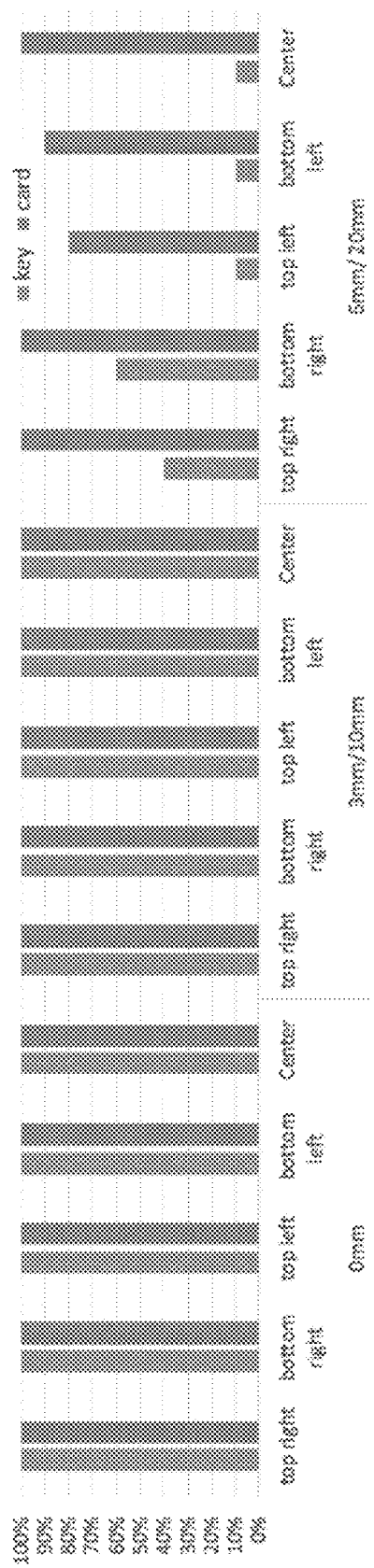
FIG. 13 illustrates the result of an experiment for testing the NFC sensors.

FIG. 13 shows the result of the experiment of the NFC sensors. As illustrated in FIG. 13, overall, the recognition accuracy for the card was 98% across all the locations and distances. The accuracy of the card dropped at both corners near the inner thigh (e.g., left corners) at the longest distance of 20 mm, indicating that the signal was weaker on that side of the pocket. This is likely because of the increase in smart fabric deformation at the far end, which consequently increased the distance of the tag. The system was able to correctly recognize the small key tag at all the tested locations in the 0 mm and 3 mm distance conditions.

However, due to the significant drop of the signal strength at the 6 mm distance, the key tag could not be reliably detected.

As described above, the system described herein can recognize many everyday objects, as well as finger gestures with high accuracy. The example embodiments illustrated herein include 4×4 or 2×2 grids of sensors, though a higher or different number of sensors and/or a larger size of the smart fabric may be implemented to improve the accuracy of the prediction models. Further, the use of the smart fabric is also not limited to a pants pocket. Other wearable scenarios may also use the piece of smart fabric, such as a hoodie or a jacket pocket, a wallet, a furniture surface, and/or a device surface. Additionally, as illustrated, the machine learning models may be built by a computing system 130 separate from the data processing circuitry 120, though in some embodiments, the machine learning models may be built by the data processing circuitry 120. Further, the computing system 130 may be a computing system (e.g., a mobile device) of a user. Alternatively, the computing system may be a computing system at the manufacture of the piece of smart fabric, and the built machine learning models may be stored in the data processing circuitry 120.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 14:
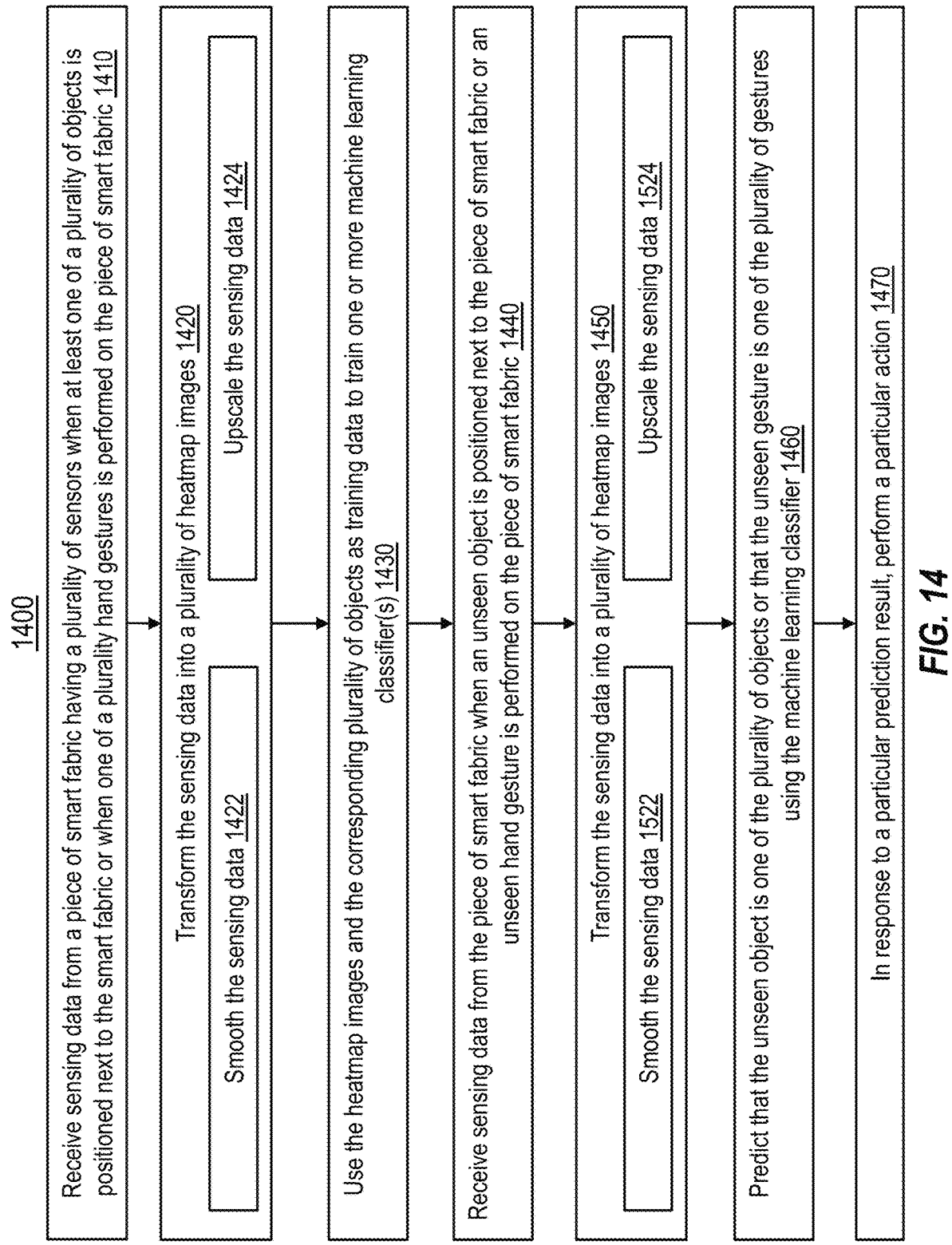
FIG. 14 illustrates a flowchart of a method for using sensing data generated by a piece of smart fabric to train one or more machine learning models and to use the trained one or more machine learning models to predict an unseen object or an unseen touch gesture.

FIG. 14 illustrates a flowchart of an example method 1400 for using sensing data generated by smart fabric to build machine learning classifiers. The method 1400 includes receiving sensing data from a piece of smart fabric when at least one of a plurality of objects is positioned next to the piece of smart fabric or when one of a plurality of hand gestures is performed on the piece of smart fabric (act 1410). The piece of smart fabric, corresponding to the piece of smart fabric 200, 400 of FIGS. 2 and 4, has a plurality of sensors, including (but not limited to) multiple capacitive sensors, multiple resistive sensors, multiple inductive sensors, and/or multiple NFC sensors.

The method 1400 also includes transforming the sensing data into a plurality of heatmap images (act 1420). In some embodiments, the transformation of the sensing data into the plurality of heatmap images (act 1420) includes smoothing the sensing data using a median filter with a sliding window having a predetermined size (e.g., 10) (act 1422) and/or upscaling the smoothed sensing data to a predetermined size using linear interpolation (act 1424). The method 1400 further includes using the heatmap images and the corresponding plurality of objects as training data to train one or more machine learning classifier(s) (act 1430).

Once the one or more machine learning classifier(s) are trained, the one or more machine learning classifier(s) may be used to predict an unseen object that is positioned next to the piece of smart fabric, and/or predict an unseen touch gesture that is performed onto the piece of smart fabric.

In some embodiments, the method 1400 also includes receiving sensing data from the piece of smart fabric when an unknown object is positioned next to the piece of smart fabric, or when an unknown hand gesture is performed on the piece of smart fabric (act 1440). Similar to act 1420, the received sensing data may also be transformed into a plurality of heatmap images (act 1450), and the transformation act 1450 may also include smoothing the sensing data using a median filter with a sliding window having a predetermined size (e.g., 10) (act 1452) and/or upscaling the smoothed sensing data to a predetermined size using linear interpolation (act 1454). The plurality of heatmap images generated corresponding to the unseen object or the unseen touch gesture are then processed by the previously trained one or more machine learning models. Receiving the heatmap images, the one or more machine learning models predict or determine that the unknown object is one of the plurality of objects, or that the unseen touch gesture is one of the plurality of gestures (act 1460).

Additionally, in some embodiments, in response to a particular prediction result, such as the unseen object is/is not a particular object, or the unseen touch gesture is/is not a particular gesture, a particular action is performed (act 1470). For example, as illustrated in FIGS. 9A and 9B, when a hand is detected in the pocket, and at the same time the user is using the smartphone, the smartphone is automatically switched into a single-hand mode. As another example, as illustrated in FIGS. 10A and 10B, when a bottle of hand sanitizer is not detected in the pants pocket, a notification may be generated, reminding the user that they should carry a hand sanitizer.

Finally, because the principles described herein may be performed in the context of a computing system (for example, the data processing circuitry 120 and the computing system 130 may be or may include one or more computing systems) some introductory discussion of a computing system will be described with respect to FIG. 15.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 15:
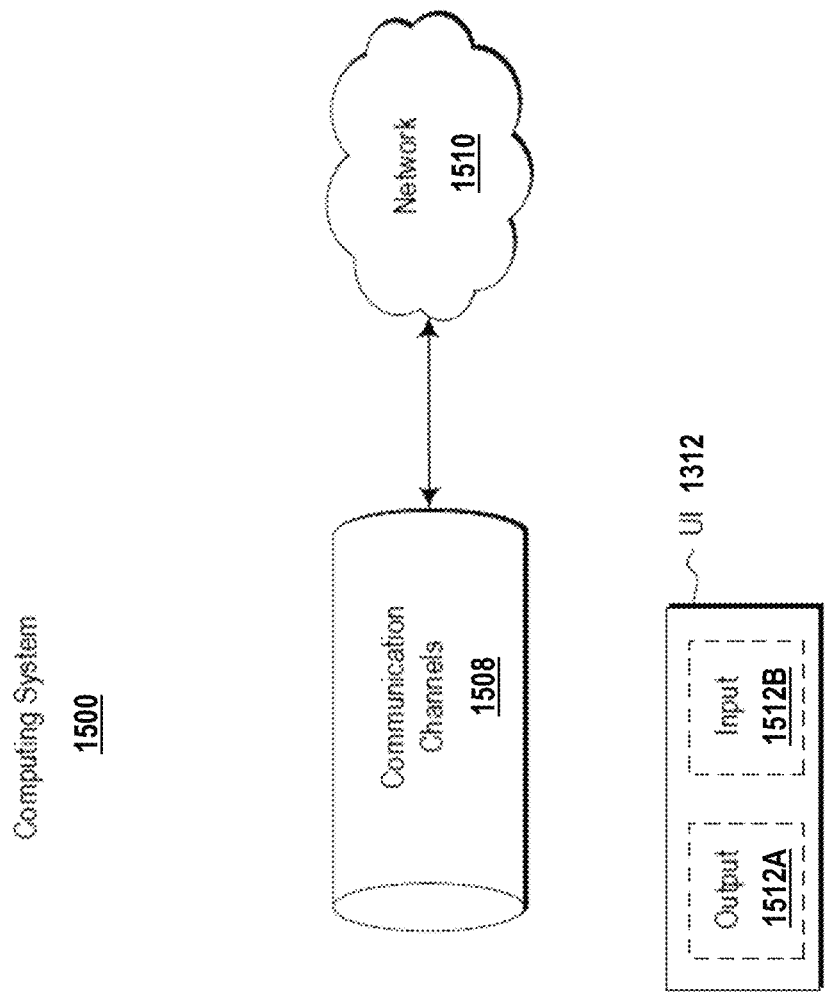
FIG. 15 illustrates an example computing system in which the principles described herein may be employed.

As illustrated in FIG. 15, in its most basic configuration, a computing system 1500 typically includes at least one hardware processing unit 1502 and memory 1504. The processing unit 1502 may include a general-purpose processor and may also include a field-programmable gate array (FPGA), an application-specific integrated circuit (ASIC), or any other specialized circuit. The memory 1504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1500 also has thereon multiple structures often referred to as an "executable component". For instance, memory 1504 of the computing system 1500 is illustrated as including executable component 1506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1504 of the computing system 1500. Computing system 1500 may also contain communication channels 1508 that allow the computing system 1500 to communicate with other computing systems over, for example, network 1510.

While not all computing systems require a user interface, in some embodiments, the computing system 1500 includes a user interface system 1512 for use in interfacing with a user. The user interface system 1512 may include output mechanisms 1512A as well as input mechanisms 1512B. The principles described herein are not limited to the precise output mechanisms 1512A or input mechanisms 1512B as such will depend on the nature of the device. However, output mechanisms 1512A might include, for instance, speakers, displays, tactile output, holograms and so forth.

Examples of input mechanisms 1512B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NTC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation)

before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 1500 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 1502 and memory 1504, as needed to perform their various functions.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A piece of smart fabric for recognizing objects or touch gestures, comprising:
   a first layer having a plurality of resistive sensors and a plurality of capacitive sensors, each of the plurality of resistive sensors corresponding to each of the plurality of capacitive sensors, respectively; and
   a second layer having a plurality of coils configured to act as both inductor coils for a plurality of inductive sensors and sensor coils for a plurality of NFC sensors, each of the plurality of inductive sensors corresponding to each of the plurality of NFC sensors, respectively.

2. The piece of smart fabric of claim 1, wherein every two adjacent coils among the plurality of coils overlap each other to improve effectiveness of the NFC sensors.

3. The piece of smart fabric of claim 1, wherein each of the plurality of coils is a rectangular shaped coil having about 5 traces.

4. The piece of smart fabric of claim 1, wherein:
   the second layer comprises a third non-conductive fabric substrate; and
   the plurality of coils comprises a plurality of insulated conductive wires stitched on the third non-conductive fabric substrate.

5. The piece of smart fabric of claim 1, wherein, in the first layer,
   each of the plurality of capacitive sensors includes a first piece of conductive fabric and a second piece of conductive fabric, and
   each of the plurality of resistive sensors includes a piece of pressure sensing fabric.

6. The piece of smart fabric of claim 5, wherein each piece of pressure sensing fabric of a resistive sensor is sandwiched between the first piece of conductive fabric and the second piece of conductive fabric of the corresponding capacitive sensor.

7. The piece of smart fabric of claim 5, wherein:
   the first layer comprises a first non-conductive fabric substrate and a second non-conductive fabric substrate;
   each of the plurality of first pieces of conductive fabric is stitched onto the first non-conductive fabric substrate, and each of the plurality of second pieces of conductive fabric is stitched onto the second non-conductive fabric substrate; and
   the first piece of conductive fabric and the second piece of conductive fabric of each corresponding capacitive sensor face each other across the first non-conductive fabric substrate and the second non-conductive fabric substrate.

8. The piece of smart fabric of claim 5, wherein the conductive fabric comprises non-metallic conductive fabric.

9. The piece of smart fabric of claim 8, wherein the non-metallic conductive fabric is a conductive polymer.

10. The piece of smart fabric of claim 9, wherein each first piece of conductive fabric and each second piece of conductive fabric has a connection line stitched at a corner thereof.

11. The piece of smart fabric of claim 10, wherein a corner of each piece of pressure-sensitive fabric that corresponds to the corner of the connection line of the conductive fabric is removed, such that the corresponding piece of pressure-sensitive fabric and connection lines are not in contact with each other.

12. The piece of smart fabric of claim 11, wherein each removed corner of the pressure-sensitive fabric is replaced with a piece of non-conductive material to insulate the connection line of the first piece of conductive fabric and the connection line of the second piece of conductive fabric of the corresponding capacitive sensor.

13. A circuitry for receiving, processing, and transmitting sensing data received from a piece of smart fabric having (1) a plurality of resistive sensors, (2) a plurality of capacitive sensors, (3) a plurality of inductive sensors, and (4) a plurality of NFC sensors, wherein the plurality of inductive sensors and the plurality of NFC sensors sharing a plurality of coils, the circuitry comprising:
- a sensor module comprising (1) a resistive sensing circuitry, (2) a capacitive sensing circuitry, (3) an inductive sensing circuitry, and (4) an NFC sensing circuitry, each of which is configured to receive respective sensing data from the respective sensors of the piece of smart fabric and convert the respective sensing data into digital sensing data;
- a multiplexer module comprising one or more multiplexer(s) configured to selectively activate at least one of (1) the resistive sensing circuitry, (2) the capacitive sensing circuitry, (3) the inductive sensing circuitry, or (4) the NFC sensing circuitry; and
- a processing module coupled to the sensor module and configured to receive the digital sensing data from the sensor module and transmit the received digital sensing data to a computing system.

14. The circuitry of claim 13, wherein the one or more multiplexer(s) comprises:
- one or more first multiplexer(s) configured to alternately activate the capacitive sensing circuitry or the resistive sensing circuitry; and
- one or more second multiplexer(s) configured to alternately activate the inductive sensing circuitry or the NFC sensing circuitry.

15. The circuitry of claim 13, wherein:
- the inductive sensing circuitry comprises a multi-channel inductance to digital converter configured to receive a plurality of channels of sensing data and convert the received plurality of sensing data into digital sensing data; and
- each of the plurality of channels corresponds to each of the plurality of coils.

16. A computing system for receiving and processing digital sensing data from a piece of smart fabric having a plurality of sensors for recognizing objects or touch gestures, comprising:
- one or more processors; and
- one or more computer-readable media having stored thereon computer-executable instructions that are structured such that, when executed by the one or more processors, configure the computing system to perform the following:
  - receive a plurality of sets of sensing data from the piece of smart fabric, the sensing data comprising at least one of (1) inductance data, (2) capacitance data, (3) resistance data, or (4) NFC data, the plurality of sets of sensing data comprising data generated when at least one of a plurality of objects is placed next to the piece of smart fabric;
  - transform the plurality of sets of digital sensing data into a plurality of heatmap images; and
  - use the plurality of heatmap images as training data for a machine learning module to train a first predictive model configured to predict an unseen object placed next to the piece of smart fabric.

17. The computing system of claim 16, wherein:
- the plurality of sets of digital sensing data comprises data generated when at least one of a plurality of touch gestures is applied onto the piece of smart fabric; and
- the computing system is further configured to use the set of digital sensing data as training data for a machine learning platform to train a second predictive model configured to predict an unseen touch gesture applied onto the piece of smart fabric.

18. The computing system of claim 17, the computing system further configured to:
- receive a set of sensing data when an unseen object is placed next to the piece of smart fabric or when a touch gesture is applied onto the piece of smart fabric;
- transform the set of sensing data into one or more heatmap images; and
- based on the one or more heatmap images, predict that the unseen object is one of the plurality of objects via the first predictive model, or predict that the unseen touch gesture is one of the plurality of touch gestures via the second predictive model.

19. The computing system of claim 18, the computing system further configured to:
- perform one of a plurality of actions, in response to the prediction that the unseen object is/is not a particular object or that the unseen touch gesture is/is not a particular touch gesture.

* * * * *